United States Patent
Nagura et al.

(10) Patent No.: US 11,290,937 B2
(45) Date of Patent: Mar. 29, 2022

(54) MOBILE SYSTEM COMMUNICATION APPARATUS

(71) Applicant: DENSO CORPORATION, Kariya (JP)

(72) Inventors: Toru Nagura, Kariya (JP); Tsuneo Nakata, Kariya (JP)

(73) Assignee: DENSO CORPORATION, Kariya (JP)

(*) Notice: Subject to any disclaimer, the term of this patent is extended or adjusted under 35 U.S.C. 154(b) by 397 days.

(21) Appl. No.: 16/267,746

(22) Filed: Feb. 5, 2019

(65) Prior Publication Data
US 2019/0253948 A1 Aug. 15, 2019

(30) Foreign Application Priority Data
Feb. 13, 2018 (JP) .............. JP2018-23121

(51) Int. Cl.
| | | |
|---|---|---|
| *H04W 36/30* | (2009.01) | |
| *H04W 4/40* | (2018.01) | |
| *H04W 36/08* | (2009.01) | |
| *H04W 36/00* | (2009.01) | |
| *H04W 36/36* | (2009.01) | |
| *H04W 88/06* | (2009.01) | |

(52) U.S. Cl.
CPC .......... *H04W 36/30* (2013.01); *H04W 4/40* (2018.02); *H04W 36/0088* (2013.01); *H04W 36/08* (2013.01); *H04W 36/36* (2013.01); *H04W 88/06* (2013.01)

(58) Field of Classification Search
CPC ... H04W 4/40; H04W 36/0088; H04W 36/30; H04W 36/36; H04W 36/08; H04W 36/32; H04W 4/025; H04W 88/06; H04W 84/12
See application file for complete search history.

(56) References Cited

U.S. PATENT DOCUMENTS

| | | |
|---|---|---|
| 2015/0245266 A1 | 8/2015 | Lee et al. |
| 2015/0334732 A1* | 11/2015 | Caretti ............... H04L 47/2433 370/329 |
| 2016/0295448 A1 | 10/2016 | Cai |
| 2017/0272972 A1* | 9/2017 | Egner ............... H04W 28/0268 |
| 2018/0295664 A1 | 10/2018 | Tang et al. |
| 2019/0239269 A1 | 8/2019 | Tang et al. |

FOREIGN PATENT DOCUMENTS

| | | |
|---|---|---|
| EP | 3073776 A1 | 9/2016 |
| JP | H11-122658 A | 4/1994 |
| JP | 2014-225743 A | 12/2014 |

* cited by examiner

*Primary Examiner* — Mandish K Randhawa
(74) *Attorney, Agent, or Firm* — Maschoff Brennan

(57) ABSTRACT

A mobile system communication apparatus is configured to perform a selection of either (i) transmitting a transmission data with a present communication characteristic or (ii) transmitting the transmission data with an advantageous communication characteristic that is more advantageous than the present communication characteristic, from a result of comparison between a target communication quality and a predicted communication quality that is predicted when communicating with the advantageous communication characteristic based on (i) a predicted position of a mobile communication apparatus and a correspondence relationship between a position and a communication characteristic used by the mobile communication apparatus.

18 Claims, 16 Drawing Sheets

MOBILE SYSTEM COMMUNICATION APPARATUS

CROSS REFERENCE TO RELATED APPLICATION

The present application claims the benefit of priority from Japanese Patent Application No. 2018-023121 filed on Feb. 13, 2018. The entire disclosure of the above application is incorporated herein by reference.

TECHNICAL FIELD

The present disclosure relates to a mobile system communication apparatus.

BACKGROUND

There is a method that estimates an offload effect occurring on a wireless network by selecting each of a plurality of wireless bearers based on a list of base stations connected by the plurality of wireless bearers. Based on the estimated offload effects, one of wireless bearers is selected, as a bearer which should transmit traffic, from the plurality of wireless bearers.

SUMMARY

According to an example of the present disclosure, a mobile system communication apparatus is configured to perform a selection of either (i) transmitting a transmission data with a present communication characteristic or (ii) transmitting the transmission data with an advantageous communication characteristic that is more advantageous than the present communication characteristic, from a result of comparison between a target communication quality and a predicted communication quality that is predicted when communicating with the advantageous communication characteristic based on (i) a predicted position of a mobile communication apparatus and a correspondence relationship between a position and a communication characteristic used by the mobile communication apparatus.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe embodiments with reference to the drawings.

First Embodiment

Figure 1:
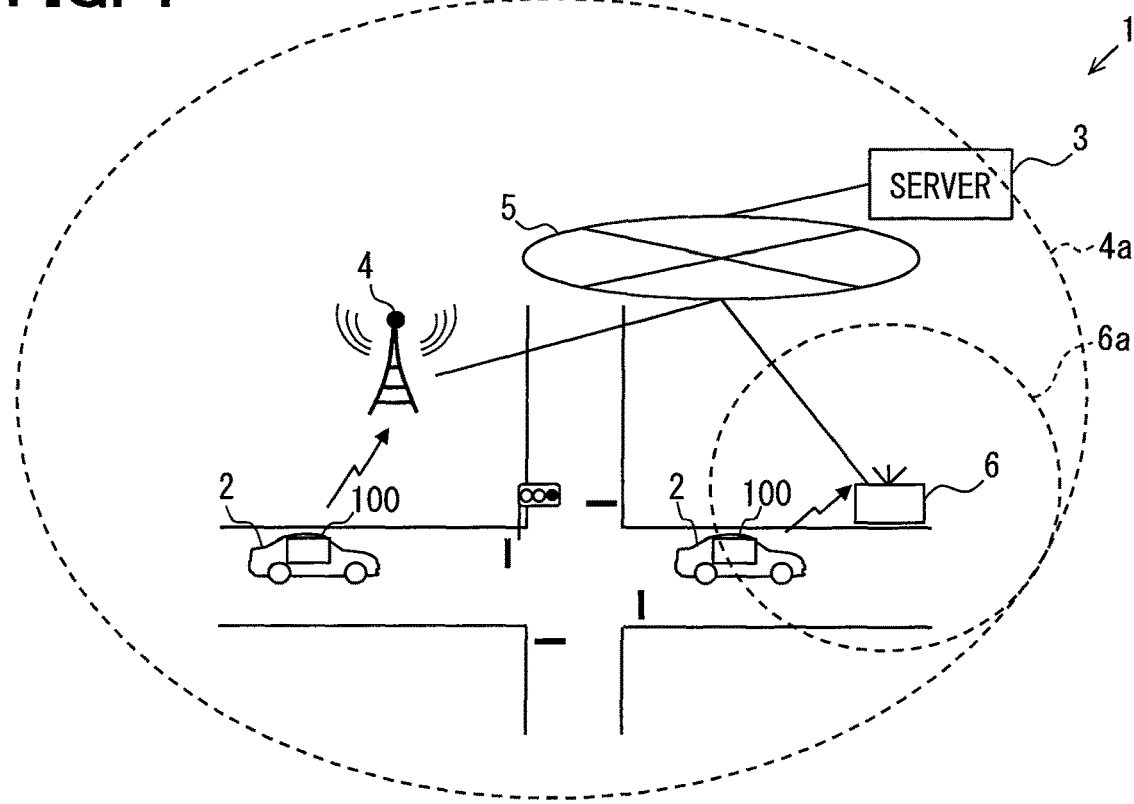
FIG. 1 is a diagram showing a usage state of a mobile terminal according to a first embodiment.

FIG. 1 shows a usage state of a mobile terminal 100. The mobile terminal 100 corresponds to a mobile communication apparatus or a mobile system communication apparatus. The mobile terminal 100 shown in FIG. 1 is used in a vehicle 2 that is a mobile object, and moves together with the vehicle 2. The vehicle 2 here is a vehicle traveling on a road. The vehicle 2 includes a four-wheeled vehicle, a motorcycle, a bicycle, and the like.

The mobile terminal 100 communicates data with a server 3. Communication of data has transmission of data and reception of data. A communication system 1 includes the mobile terminal 100 and the server 3 along with a configuration related to the communication between the mobile terminal 100 and the server 3. The communication between the mobile terminal 100 and the server 3 can be performed via a wide area base station 4 and a communication network 5. The wide area base station 4 includes a communication apparatus capable of performing wireless communication with cellular phones.

Also, the communication between the mobile terminal 100 and the server 3 can be performed via a wireless LAN access point 6 which is a narrow area base station and the communication network 5. Since the wireless LAN access point 6 is also connected to the communication network 5 like the wide area base station 4, the wireless LAN access point 6 can communicate with the server 3.

The communication area 6a of the wireless LAN access point 6 is narrower than the communication area 4a of the wide area base station 4. The communication area 6a of the wireless LAN access point 6 is, for example, about several hundred meters or less in radius. Note that the sizes and shapes of the communication areas 4a and 6a shown in FIG. 1 do not represent actual size or actual shape for convenience of illustration.

Although FIG. 1 illustrates a single wide area base station 4 and a single wireless LAN access point 6, a plurality of the wide area base stations 4 and a plurality of the wireless LAN access points 6 are provided.

In the first embodiment, it is assumed that the communication between the mobile terminal 100 and the server 3 via the wireless LAN access point 6 is cheaper in communication cost (that is, it is lower in cost) than the communication via the wide area base station 4. In the first embodiment, the wide area communication and the wireless LAN are two types of communication lines that the mobile terminal 100 can use. These two types of communication lines correspond to two communication characteristics. Since the wireless LAN is lower in cost, the wireless LAN is a more advantageous communication line than the wide area communication at the index "cost".

The first embodiment will describe a configuration in which the mobile terminal 100 can transmit transmission data at a low cost while satisfying the requested communication quality. Data transmission from the mobile terminal 100 to the server 3 is transmission using uplink; data transmission from the server 3 to the mobile terminal 100 is transmission using downlink. That is, the first embodiment will describe a configuration in which transmission data is transmitted at a low cost while satisfying the requested communication quality in uplink transmission.

[Configuration of Mobile Terminal 100]

Figure 2:
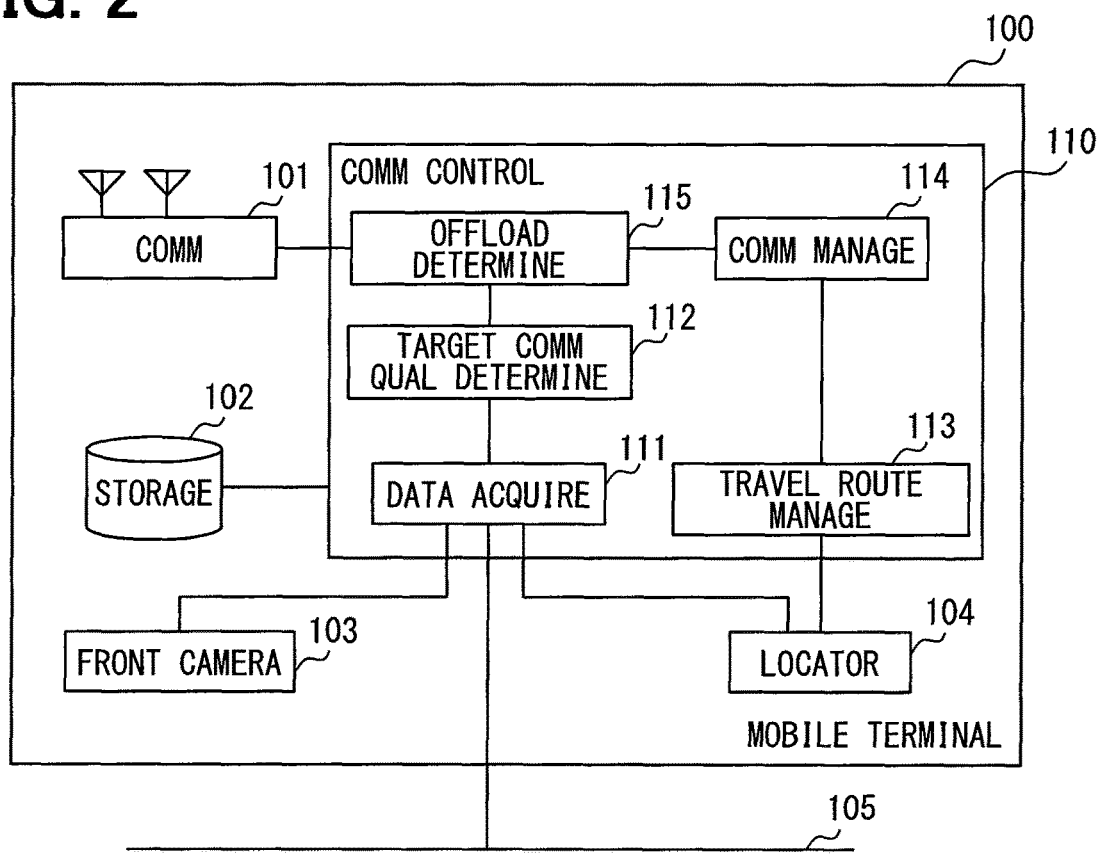
FIG. 2 is a block diagram showing a configuration of a mobile terminal.

As shown in FIG. 2, the mobile terminal 100 includes a communication unit 101, a storage unit 102, a front camera 103, a locator 104, and a communication control circuit 110.

The communication unit 101, which is also referred to as a communicator or a transceiver, includes (i) a wide area communication function for performing wireless communication with the wide area base station 4 and (ii) a narrow area communication function (i.e., a wireless LAN communication function) for performing wireless communication with the narrow area base station. The wide area communication function is a function of communicating with any one or more of (i) LTE (Long Term Evolution), (ii) WiMAX (Worldwide Interoperability for Microwave Access), and (iii) 5G, for example. The following description assumes that wide area communication is performed in LTE.

The storage unit 102, which is also referred to as a storage, temporarily stores the transmission data acquired by the data acquisition section 111. The storage unit 102 uses a RAM, a flash memory, or the like.

The front camera 103 captures an image of a front area in front of the vehicle 2. The locator 104 is an element for sequentially detecting the position of the vehicle 2 and includes one or more position measurement apparatuses. For example, the locator 104 includes a GNSS receiver and an inertial sensor.

[Configuration of Communication Control Circuit 110]

The communication control circuit 110 performs the functions by including sections such as a data acquisition section 111, a target communication quality determination section 112, a travel route management section 113, a communication management section 114, and an offload determination section 115.

As an example of the present embodiment, the communication control circuit 110 is configured by using at least one computer including a CPU, a ROM, a RAM, an I/O, and a bus line connecting these components. The ROM stores a program for causing the computer to function as the communication control circuit 110 or the above sections or the like. The CPU executes the program stored in the ROM while utilizing the temporary storage function of the RAM. When the above-described functions are executed, a method corresponding to the program is executed.

Note that a storage medium for storing the program executed by the CPU is not limited to the ROM but may be stored in a non-transitory tangible storage medium. For example, the program may be stored in a flash memory. A part or all of the functions of the communication control circuit 110 may be realized by using at least one IC or the like (in other words, using at least one hardware circuit). Further, a part or all of the functions of the communication control circuit 110 may be realized by a combination of (i) at least one CPU along with memory storing instructions and (ii) at least one hardware circuit.

The data acquisition section 111 acquires transmission data. The transmission data is data to be transmitted from the communication unit 101. The transmission data is, for example, image data of areas ahead of the vehicle acquired from the front camera 103. In addition, the present position of the vehicle 2 detected by the locator 104 may also become transmission data.

The data acquisition section 111 is connected to the in-vehicle LAN 105 and can also acquire data from various sensors and ECUs in the vehicle via the in-vehicle LAN 105. Examples of data that can be acquired via the in-vehicle LAN 105 include image data captured by a side camera of the vehicle, image data captured by a camera in the passenger compartment, operating states of an air conditioner controlled by an air conditioner ECU, and the like. The data acquired via the in-vehicle LAN 105 can also be used as transmission data. Which data to acquire as transmission data can be determined by various methods. For example, it can be determined by a query that acquires the type of data to be acquired as transmission data from an external source outside the vehicle. Also, the type of data to be acquired as transmission data can be set in advance.

In addition to the transmission data, the data acquisition section 111 also acquires a requested communication quality of the transmission data. The requested communication quality is a communication quality required for transmission of transmission data and includes a tolerance delay DL. The communication quality in this case is a delay time until data can be transmitted; the tolerance delay DL is an allowed period of time from the generation of the transmission data to the complete transmission of the transmission data. The first embodiment assumes that only the tolerance delay DL is included as the requested communication quality.

Figure 3:
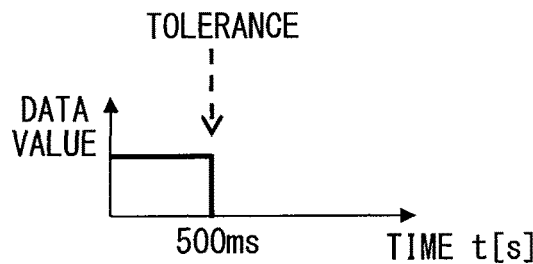
FIG. 3 is a diagram showing a tolerance delay of image data of a remote monitoring service.

The tolerance delay DL is determined by the type of transmission data. FIGS. 3 to 6 illustrate the time-based change of the data value and the tolerance delay DL for various transmission data. In FIG. 3, the type of data is image data used for a remote monitoring service. This image data is captured by a camera such as the front camera 103. In the example shown in FIG. 3, the data value of this image data is constant until 500 ms from the data generation, and is zero when the elapsed time is 500 ms. Therefore, the tolerance delay DL is set to 500 ms.

Figure 4:
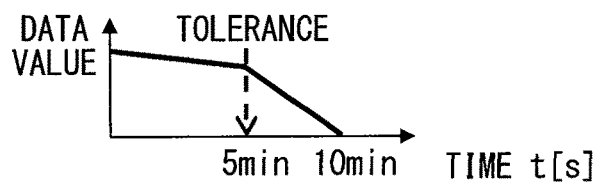
FIG. 4 is a diagram showing a tolerance delay of image data of a road environment anomaly detection service.

In FIG. 4, the type of data is image data used for a road environment anomaly detection service. This image data is also image data captured by the front camera 103 or the like. However, since the application is different from that in FIG. 3, the time-based change of the data value is different from that in FIG. 3. In FIG. 4, the data value shows a monotonous decrease slope with elapsed time since the data generation, and then shows a steeper decrease slope after exceeding 5 minutes. Therefore, the tolerance delay DL is set to 5 minutes.

Figure 5:
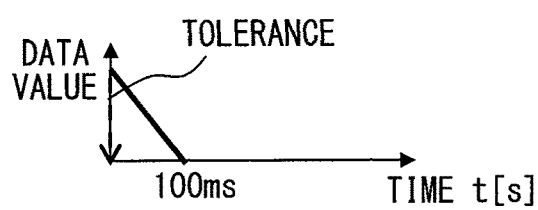
FIG. 5 is a diagram showing a tolerance delay of a control signal of a remote control service.

In FIG. 5, the type of data is a control signal used for a remote control service. Such a control signal reduces the data value immediately just after the time of data generation. Therefore, the tolerance delay DL is 0 (zero) second.

Figure 6:
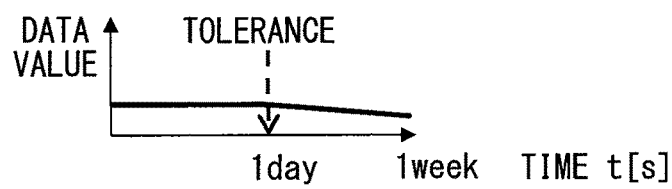
FIG. 6 is a diagram showing a tolerance delay of software update data of an OTA service.

In FIG. 6, the data type is a software update data for an OTA (OverTheAir) service. Since the software update is not highly urgent, as shown in FIG. 6, the data value does not change until one day elapses since the time of data generation and gradually decreases after one day. Therefore, the tolerance delay DL is set to 1 day. Thus, the tolerance delay DL differs depending on the type and use of transmission data. Therefore, the tolerance delay DL is determined based on (i) the relationship of determining the tolerance delay DL according to the type and use of transmission data and (ii) the transmission data acquired by the data acquisition section 111.

The target communication quality determination section 112 determines a target communication quality for the transmission data acquired by the data acquisition section 111. The target communication quality is a communication quality as a target, and is determined based on the requested communication quality. In the first embodiment, the required communication quality is set as a target communication quality as it is.

The travel route management section 113 predicts a future travel route of the mobile terminal 100. The future travel route also shows a future position. Therefore, the travel route management section 113 is a position prediction section, and also predicts a future position of the mobile terminal 100. The position predicted by the travel route management section 113 will be hereinafter referred to as a predicted position. Further, the future travel route will be hereinafter referred to as a predicted travel route. The travel route management section 113 predicts a predicted position in association with time.

The travel route management section 113 is connected to the locator 104, and sequentially acquires the position of the mobile terminal 100. The locus of the sequentially acquired position of the mobile terminal 100 is extended to predict a future travel route of the mobile terminal 100. The moving speed of traveling along the travel route can be an average moving speed of the travel locus so far. It can also be based on a general travel speed or a legal speed of each of the roads that are traveled.

Further, the travel route management section 113 may function as a navigation apparatus or may be connectable to a navigation apparatus. When the navigation apparatus sets a guidance route up to a destination, the travel route management section 113 can determine the guidance route as a predicted travel route. The guidance route corresponds to a movement plan.

Figure 7:
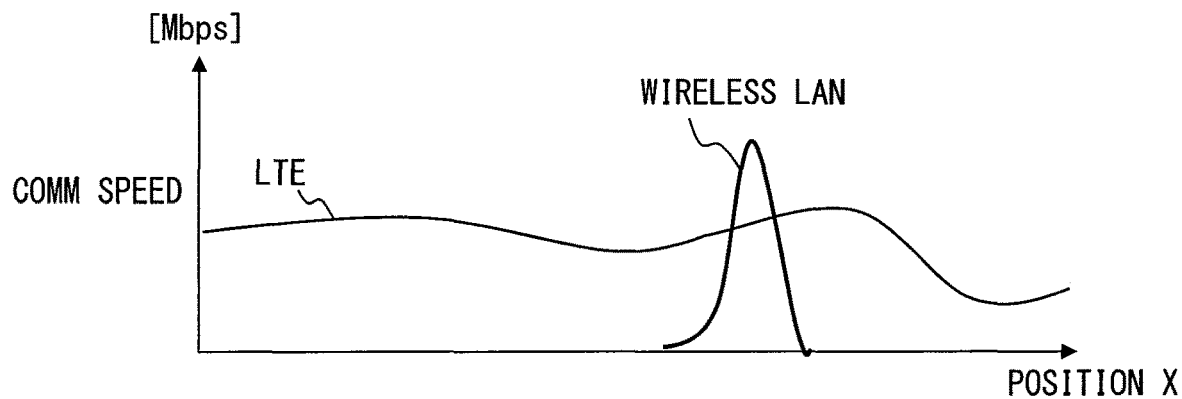
FIG. 7 is a diagram for explaining a relationship between a position and a communication speed.

The communication management section 114 manages the communication resources of communication lines that the communication unit 101 can use. Moreover, the relationship between the position and the communication speed is managed for each communication line. FIG. 7 is a diagram for explaining the relationship between the position and the communication speed, which is stored in the communication management section 114. In FIG. 7, for the sake of convenience of illustration, the position is set to the x direction which is a predetermined linear direction, and the change of the communication speed accompanying the change of the position in the x direction is shown for the LTE and the wireless LAN. The communication management section 114 stores not only the direction of the position X but also the relationship between the two-dimensional position and the communication speed. However, this relationship need not always be memorized, and it may be acquired from an external resource such as the server 3 every time necessary.

The relationship between the position and the communication speed is, for example, statistically processed. This relationship may be associated with at least one parameter of several parameters that include (i) the date and time, (ii) the vehicle type, (iii) the vehicle state, (iv) the terminal type, (v) the compliance standard, and (vi) the type of data to be communicated. Further, since the relationship between the position and the communication speed can be acquired from an external source when necessary, it can be set as an instantaneous value that dynamically changes.

Further, the communication management section 114 also has a function as a communication quality prediction section. The communication management section 114 predicts a predicted communication quality in the case of transmitting the transmission data in the wireless LAN which is an advantageous communication characteristic, based on the predicted position predicted by the travel route management section 113 and the relationship between the position and the communication speed illustrated in FIG. 7.

The advantageous communication characteristic signifies a communication characteristic that the mobile terminal 100 can use in a future, i.e., from now on, due to the movement of the mobile terminal 100 itself, the communication characteristic being more advantageous than the present communication characteristic. The mobile terminal 100 according to the first embodiment has a configuration capable of using an LTE and a wireless LAN as communication lines serving as communication characteristics. Suppose a case that although only the LTE is enabled to be used at a present position, the wireless LAN will be enabled to be used after the movement. In such a case, the wireless LAN may be an advantageous communication line, i.e., an advantageous communication characteristic.

When such an advantageous communication characteristic is existing, the communication management section 114 predicts a predicted communication quality which is predicted when the transmission data is to be transmitted with the advantageous communication characteristic. In the first embodiment, the communication quality is a delay time until data is enabled to be transmitted. In order to transmit the transmission data in the wireless LAN, it is necessary for the mobile terminal 100 to first enter a communication area 6a of the wireless LAN access point 6. The communication management section 114 therefore predicts, as a predicted communication quality, a movement prediction time TM (which may be also referred to as a predicted movement period of time) up to the time when reaching the communication area 6a. The movement prediction time TM is predicted from (i) the predicted position predicted in association with the time by the travel route management section 113, and (ii) the relationship between the position and the communication speed illustrated in FIG. 7.

The offload determination section 115, which corresponds to a selection section, compares the tolerance delay DL of the transmission data with the movement prediction time TM. Then, when the following Expression 1 is fulfilled, it is determined that the transmission data is transmitted in the wireless LAN. This is because when Expression 1 is fulfilled, it can be estimated that the transmission data be transmitted in the wireless LAN that is a low-cost communication line while satisfying the tolerance delay DL.

$$DL > TM \qquad \text{(Expression 1)}$$

When it is determined that Expression 1 is fulfilled, the offload determination section 115 does not transmit the transmission data at the present position but will transmit the transmission data after the mobile terminal 100 will enter the communication area 6a of the wireless LAN access point 6. On the other hand, when determining that Expression 1 is not fulfilled, the offload determination section 115 transmits the transmission data using the LTE at the present position.

Note that when the present position is located within the communication area 6a of the wireless LAN access point 6, the communication management section 114 does not need to calculate the movement prediction time TM. Further, the offload determination section 115 determines that the transmission data is transmitted in the wireless LAN without need of determining whether Expression 1 is fulfilled.

Figure 8:
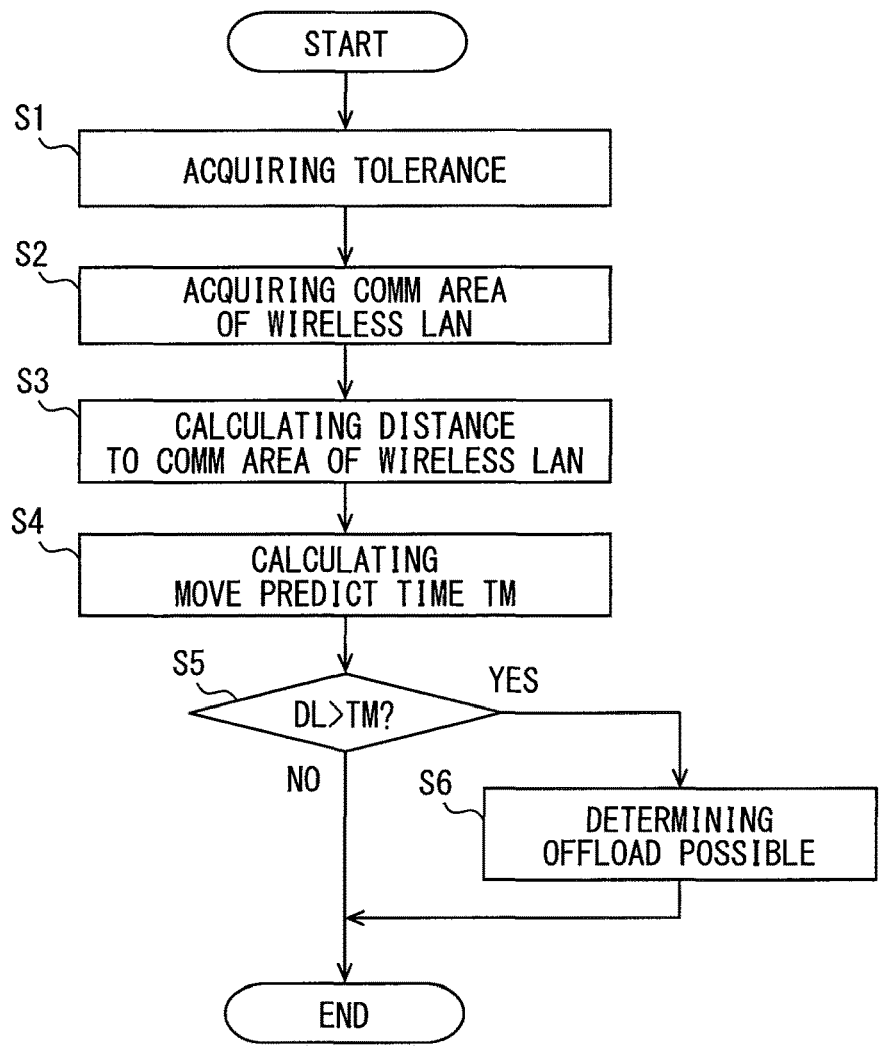
FIG. 8 is a flowchart showing a process executed by a communication control circuit according to the first embodiment.

[Sequence of Process of communication control circuit 110] FIG. 8 is a flowchart showing a process including sections (expressed as S) executed by the communication control circuit 110. The process shown in FIG. 8 starts with the acquisition of transmission data by the data acquisition section 111 as a trigger.

First, S1 is executed by the data acquisition section 111. In S1, the tolerance delay DL of the transmission data is acquired. S2, S3 are executed by the travel route management section 113. In S2, the range of the communication area 6a of the wireless LAN access point 6 is acquired. In S3, the distance from the present position to the communication area 6a of the wireless LAN access point 6 is calculated.

S4 is executed by the communication management section 114. In S4, the movement prediction time TM, which is a period of time required to move the distance calculated in S3, is calculated. S5, S6 are executed by the offload determination section 115. In S5, it is determined whether the tolerance delay DL is longer than the movement prediction time TM. When the determination result in S5 is YES, the processing proceeds to S6. In S6, it is determined that offloading is possible. That is, the wireless LAN is selected as a communication line for transmitting the transmission data. When the determination result in S5 is NO, the process shown in FIG. 8 is ended without executing S6. This case does not select the wireless LAN. In other words, the LTE line is selected as a communication line for transmitting the transmission data.

Summary of First Embodiment

In the first embodiment, when acquiring transmission data, a movement prediction time TM necessary for moving to a position where communication can be performed in the wireless LAN is calculated (S4). When the movement prediction time TM is shorter than the tolerance delay DL of the transmission data (S5: YES), the wireless LAN is selected as the communication line for transmitting the transmission data (S6). In cases where at the present time, the wireless LAN is selected under the condition that only the LTE is available but the wireless LAN is not available, the mobile terminal 100 moves to the communication area 6a of the wireless LAN access point 6 and then transmits the transmission data.

As described above, according to the present embodiment, even if a position where a transmission data is acquired is not a position where the transmission data can be communicated by a wireless LAN, the transmission data can be transmitted using the wireless LAN which is a low-cost communication line while satisfying the requested communication quality of the transmission data.

Second Embodiment

Next, a second embodiment will be described. In the following description of the second embodiment, other embodiments, or modified examples, the elements having the same reference signs as those used up to now are the same as the elements of the same reference signs in the preceding embodiment or the like, unless otherwise mentioned. In addition, when only a part of the configuration is described, the preceding embodiment or the like can be applied to other parts of the configuration.

Figure 9:
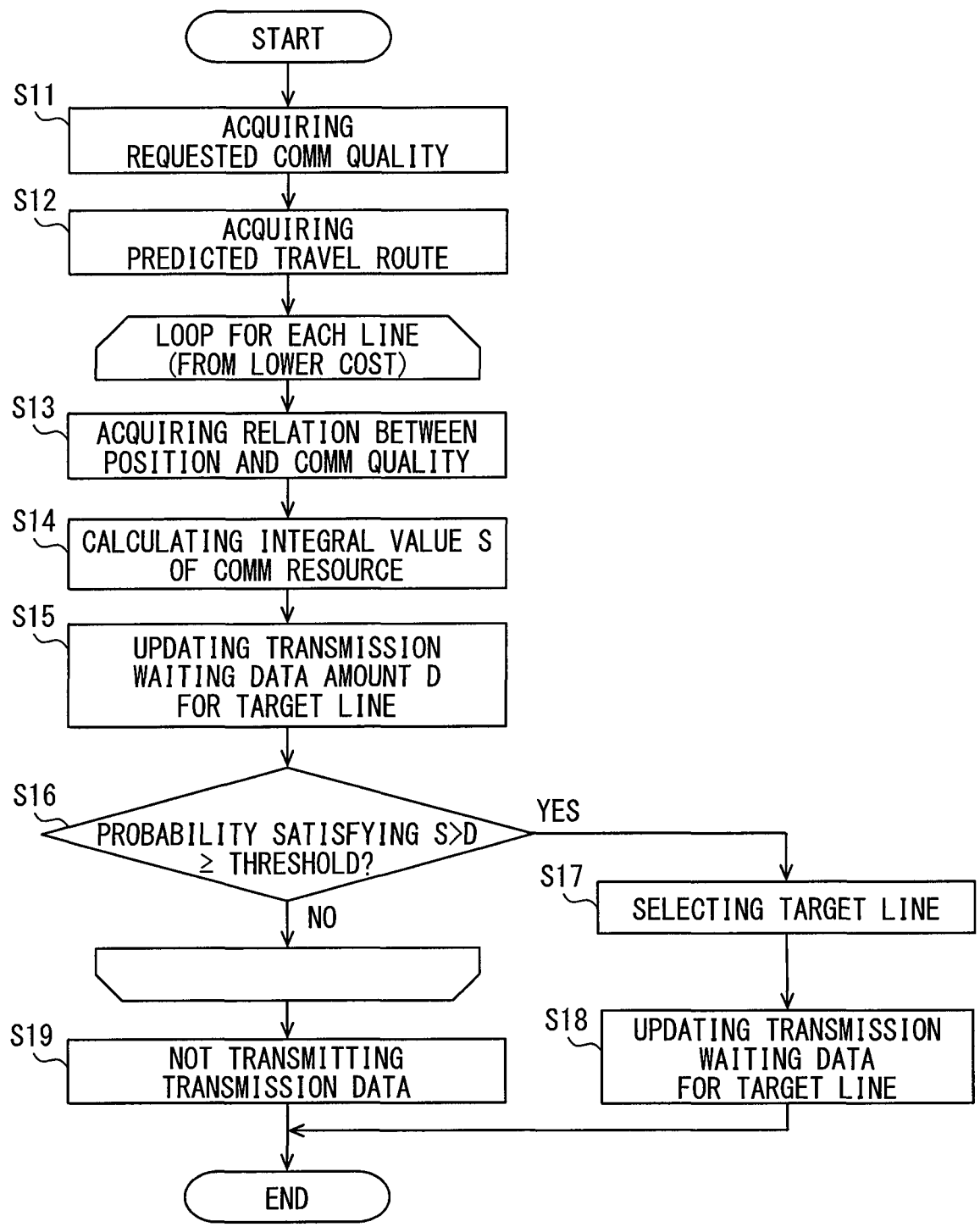
FIG. 9 is a flowchart showing a process executed by a communication control circuit according to a second embodiment.

The second embodiment will describe another process of the communication control circuit 110 which is different from that in the first embodiment. The process of the communication control circuit 110 according to the second embodiment will be described with reference to a flowchart shown in FIG. 9. The process shown in FIG. 9 is a process to be executed instead of the process shown in FIG. 8. Therefore, the process shown in FIG. 9 starts with the acquisition of transmission data by the data acquisition section 111 as a trigger.

S11 is executed by the data acquisition section 111. In S11, the requested communication quality of transmission data is acquired. In the second embodiment, not only the tolerance delay DL but also the data amount of the transmission data is added to the required communication quality.

S12 is executed by the travel route management section 113. In S12, a predicted travel route is acquired. S13 to S16 are a loop for each communication line and are executed in order of the cost of the communication line from a lower cost. As described in the first embodiment, the wireless LAN provides a lower cost than the LTE. Therefore, the loop from S13 onward is executed first from the wireless LAN.

S13 and S14 are executed by the communication management section 114. In S13, the relationship between the position of the target communication line and the communication quality is acquired. This relationship corresponds to the relationship illustrated in FIG. 7. In S14, until the maximum limit time point of the tolerance delay DL, the integral value S of the communication resource that can be transmitted using the target communication line is calculated. The integral value S of the communication resource signifies an amount of data that can be communicated.

Figure 10:
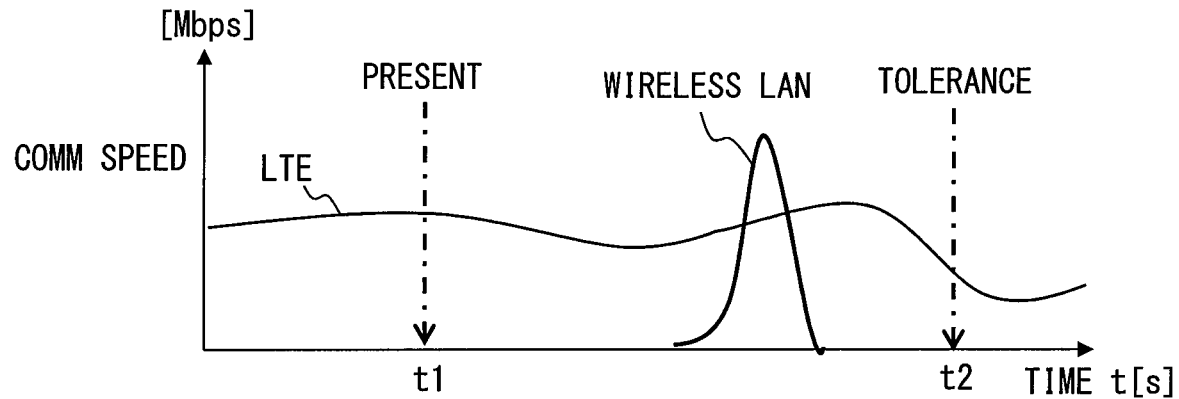
FIG. 10 is a diagram showing a relationship between time and a communication speed.

In order to calculate the integrated value S of the communication resource, as illustrated in FIG. 10, the relationship between the time and the communication speed is determined from (i) the relationship between the position and the communication speed illustrated in FIG. 7 and (ii) the predicted travel route acquired in S12. In the relationship between the time and the communication speed, the communication speed of a target wireless communication line is integrated from the present time (that is, the data acquisition time) t1 to time t2 that is the maximum limit time point of the tolerance delay DL. In the second embodiment, the integrated value S is a predicted communication quality.

In S14, instead of uniquely calculating the integral value S of the communication resource, the integral value S is calculated as a probability distribution to be acquired. In order to calculate this probability distribution, for example, a normal distribution probability of the integral value S is determined with the integral value S of the communication speed of the wireless LAN shown in FIG. 10 regarded as a median value.

S15 is executed by the target communication quality determination section 112. In S15, the transmission waiting data amount D that is waiting for transmission in the target communication line is updated. The transmission waiting data amount D is calculated by adding the data amount D2 of the transmission data acquired at this time to the data amount D1 that is waiting for transmission in the target communication line. The transmission waiting data amount D is a data amount of a data requested to be transmitted before the maximum limit time point of the tolerance delay DL; the transmission waiting data amount D is a target communication quality.

S16 and the subsequent processing are executed by the offload determination section 115. In S16, it is determined whether or not the probability of fulfilling Expression 2 is equal to or more than a threshold value. The reason why whether the probability of fulfilling the expression 2 is fulfilled is employed rather than simply employing whether the expression 2 is fulfilled is that the integrated value S of the communication resource is calculated using the probability distribution.

$$S > D \quad \text{(Expression 2)}$$

The probability of fulfilling Expression 2 is, for example, the ratio of the portion that is larger than the transmission waiting data amount D in the probability distribution of the integral value S of the communication resource calculated in S14. The threshold value used here is determined by the type and usage of the transmission data. For example, if the transmission data is used for safety system applications, the threshold value is increased. When the determination result in S16 is YES, the process proceeds to S17.

In S17, the communication line which is a target of the processing of S13 to S16 is selected as a communication line for transmitting a transmission data. In S18, the transmission data which triggered the start of FIG. 9 is added to the transmission waiting data in the target communication line at the present time.

Under the determination result in S16 being NO, if there is a communication line on which the loop of S13 and the subsequent processing is not yet executed, the type of communication line is switched to another type of communication line and S13 and the subsequent processing are executed. On the other hand, under the determination result in S16 being NO, if the processing in S13 and the subsequent processing have been executed for all the types of communication lines, the process proceeds to S19. In S19, it is determined that the presently acquired transmission data is not transmitted. This is because there is a high possibility that prevents the transmission data from being transmitted while satisfying the requested communication quality.

Summary of Second Embodiment

In the second embodiment, the data amount is also taken into consideration as a requested communication quality. Therefore, the accuracy of determining whether or not transmission data can be transmitted using a wireless LAN while satisfying the requested communication quality is improved as compared with the first embodiment.

Third Embodiment

Figure 11:
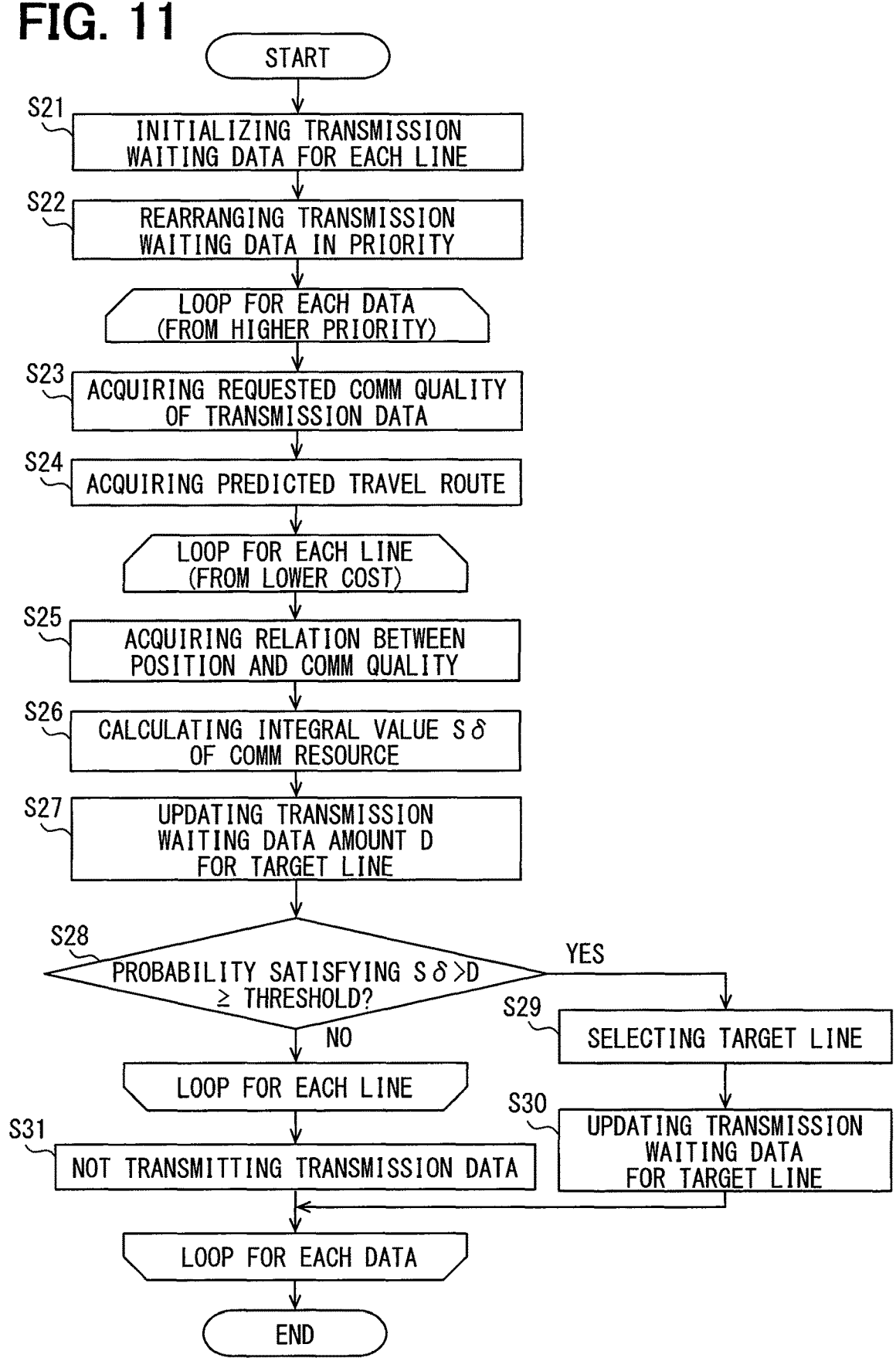
FIG. 11 is a flowchart showing a process executed by a communication control circuit according to a third embodiment.

A third embodiment will describe a process of the communication control circuit 110 that is different from that of each of the first embodiment and the second embodiment. The process of the communication control circuit 110 of the third embodiment will be described with reference to a flowchart shown in FIG. 11. The process shown in FIG. 11 is a process to be executed instead of the process shown in FIG. 8. Therefore, the process shown in FIG. 11 starts with the acquisition of transmission data by the data acquisition section 111 as a trigger.

In addition, the communication control circuit 110 executes the process shown in FIG. 11 also when acquiring a data request query before data acquisition. The data request query is a command signal specifying the contents of data of which the transmission is requested. The data request query specifies the type of a requested data, the usage of the requested data, the position where the data is acquired, the time at which the data is acquired, and the like. Further, the tolerance delay DL and the data priority may be specified.

Further, the communication control circuit 110 re-executes FIG. 11 also when the reselection time has elapsed since the previous execution of FIG. 11. Even when the parameters for determining a target communication quality and the predicted communication quality are updated, FIG. 11 is re-executed. The update of the parameters that determine the target communication quality includes a change in the data amount. The change in the data amount further includes (i) a case that new data is acquired, and (ii) a case that data to be scheduled to be transmitted becomes unnecessary. The parameters for determining a predicted communication quality include a change in the communication speed and a change in the predicted position. The communication speed is changed, for example, due to a change in a congestion degree of a communication line. The case of changing a predicted position includes a speed change due to a route change, a congestion, and the like.

When FIG. 11 is executed the second time or later, the communication line for transmitting the transmission data is reselected. Therefore, the condition of the reselection may be fulfilled by the fact that the reselection time has elapsed, or by the fact that the parameter for determining the target communication quality and the predicted communication quality has been updated.

S21 and S22 are executed by the offload determination section 115. In S21, the transmission waiting data for each communication line is initialized, that is, is set to zero. This is to select a communication line again for all the transmission waiting data by the following processing.

In S22, the transmission waiting data are rearranged in order of priority for each type of data. In the third embodiment, the data acquisition section 111 acquires a priority of transmission data as a requested communication quality in addition to the tolerance delay DL and the data amount. In S22, according to this priority acquired by the data acquisition section 111, the transmission waiting data are rearranged. The priority is predetermined based on the type of transmission data.

S23 and the subsequent processing are formed as double loops. The loop from S23 to S31 is executed for each transmission data in an order of the priority from higher to lower.

S23 is executed by the data acquisition section 111. In S23, the requested communication quality of the transmission data is acquired. The third embodiment acquires the tolerance delay DL, the data amount of transmission data, and the priority. Alternatively, a unit value price of data may be acquired instead of the priority.

The process of FIG. 11 is also executed when a data request query is acquired. In this case, the required communication quality of the transmission data is determined based on the content specified in the data request query. The data request query specifies the type and usage of data to be requested. As already explained, once the data type and usage are determined, the tolerance delay DL can be determined. The data amount can be calculated from the type of data and the period of time during which the data can be acquired. For example, suppose a case that the type of data is a moving image and the period of time during which the data can be acquired is 5 minutes from 10:00 to 10:05. Such a case calculates the data amount by multiplying the data amount of the moving image per unit time by 5 minutes. The priority of transmission data may be determined in advance for each type of data and usage.

S24 is executed by the travel route management section 113. In S24, a predicted travel route is acquired. The processing shown in FIG. 11 is executed to be repeated sequentially. The predicted travel route in a time frame from now on close to the present time is predicted using the latest traveling condition of the vehicle 2 and the latest road condition. The latest traveling state includes the latest traveling locus, vehicle speed, and traveling direction. The latest road condition includes the latest mixed road condition, the light color of the traffic signal, and the like. The use of the above improves a prediction accuracy of the predicted position as the predicted time point is closer to the present time.

S25 to S28 are looping processing for each communication line. S25 and S26 are executed by the communication management section 114. S25 is the same as S13 of FIG. 9, and acquires the relationship between the position and the communication quality of a target communication line.

In S26, the integral value Sδ of the communication resource is calculated. The integral value Sδ of this communication resource is a value that takes into consideration the error of the communication resource amount that can be used up to the maximum limit time point of the tolerance delay DL. As in S14 of FIG. 9, the integrated value Sδ of the communication resource is calculated using (i) the relationship between the position and the communication speed illustrated in FIG. 7 and (ii) the predicted traveling route.

Note that an error is existing in the relationship between the time and the position predicted by the predicted travel route against the relationship between the time and the position when the vehicle 2 actually travels in future. In consideration of such an error, the integrated value Sδ of the communication resource is calculated. Factors that cause an error in the relationship between the time and the position predicted by the predicted travel route include, for example, a traffic jam, a stopping period of time at traffic signal, a change in vehicle speed, and the like. Due to such factors, the error in a period of time during which the vehicle 2 travels a predetermined distance is caused to be greater as the predetermined distance becomes longer. In other words, the estimation error in the distance traveled by the vehicle 2 is greater as the time is late, i.e., in a farther future.

Therefore, in S26, an error±Δd of a distance occurring while traveling up to the maximum limit time point of the tolerance delay DL is estimated. A position in a planned traveling route that the vehicle 2 reaches up to the maximum limit time point of the tolerance delay DL is defined as a position farther, by the error of the distance, than that in the case not predicting an error.

Figure 12:
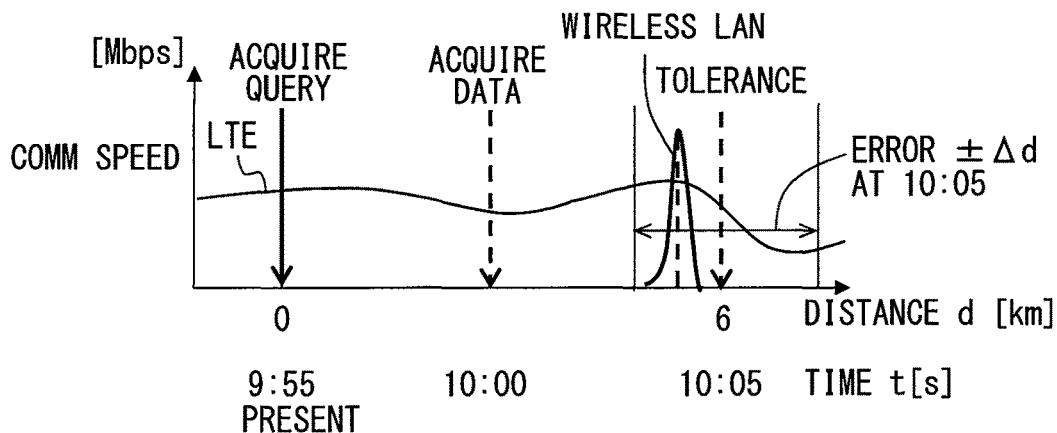
FIG. 12 is a diagram which estimates, at 9:55, an error in distance at the maximum limit time point of a tolerance delay.

A specific example is shown in FIG. 12. In the example shown in FIG. 12, a data request query is acquired at 9:55. This data request query acquired at 9:55 is supposed to request that the image at 10:00 be transmitted with a tolerance delay DL of 5 minutes. In FIG. 12, the horizontal axis indicates the distance d, which the vehicle 2 has moved with the time. This distance d is based on the position of the vehicle 2 at the time of acquiring the data request query.

At 10:05, it can be estimated that the distance d becomes 6 km unless errors are considered. Further, at the time of 10:05, the error±Δd of the distance shown in FIG. 12 can also be estimated. Therefore, the integrated value Sδ of the communication resource is calculated to be a value acquired by the integrating communication resource that can be used up to 6 km+Δd. The integrated value Sδ of this communication resource is the maximum amount of data that may possibly be transmitted up to the maximum limit time point of the tolerance delay DL in consideration of the error. This value corresponds to a predicted communication quality.

S27 is executed by the target communication quality determination section 112. In S27, the transmission waiting data amount D in the target communication line is updated. The transmission waiting data amount D is a value obtained by adding the data amount D2 of the transmission data which is the target of processing in the present loop to the transmission waiting data amount D1 in the target communication line. The transmission waiting data amount D is a target communication quality. Note that the data amount D1 here is updated in S30 to be described later, and it is determined in which transmission line the transmission data be transmitted, sequentially from the transmission data having the higher priority. The S28 and the subsequent processing are executed by the offload determination section 115. In S28, it is determined whether or not the probability of fulfilling Expression 3 is equal to or more than a threshold value.

$$S\delta > D \quad \text{(Expression 3)}$$

The determination result in S28 is the same as S16 of FIG. 9 except that the left side of the expression is different. When the determination result in S28 is YES, the process proceeds to S29. In S29, the communication line which is the target of the processing of S25 to S28 is selected as a communication line for transmitting the transmission data. Note that suppose a case that the determination result in S28 is YES due to the presence of the amount of data to be transmitted in the communication area 6a of the wireless LAN access point 6 within the range of the error Δd of the distance d. In such a case, the determination result in S28 is withheld. Even when being withheld, the communication line is selected similar to the case of not being withheld. In this case, the selection of a communication line is regarded as a provisional selection.

The difference of the case of being withheld is that before actually transmitting the transmission data, the process shown in FIG. 11 is executed again for determining the communication line. In S30, the transmission data which is a target of the present processing is added to the transmission waiting data in the target communication line at present time.

After execution of S30, if there is an unexecuted transmission data which is a transmission data having not undergone S23 and the subsequent processing, the processing target of the transmission data is switched to such an unexecuted transmission data and S23 and the subsequent processing are then executed.

On the other hand, when the determination result in S28 is NO, if there is an unexecuted communication line that is another communication line having not undergone S25 and the subsequent processing, the processing target of the communication line is switched to such an unexecuted communication line and S25 and the subsequent processing are then executed. When the determination result in S28 is NO and S25 and the subsequent processing have been executed for all available or usable communication lines, the process proceeds to S31. In S31, it is determined that the transmission data which is the processing target at present is not transmitted.

Description of Effect of Third Embodiment

In the third embodiment, the process shown in FIG. 11 is also executed when a data request query is acquired. Thus, even before acquiring a transmission data, it is possible to ensure the communication data amount in the wireless LAN for transmitting the transmission data.

Further, in the third embodiment, even after selecting a communication line to be used for one transmission data, the process shown in FIG. 11 is executed again when the parameters for determining the target communication quality and the predicted communication quality are updated. When acquiring a transmission data requested by the data request query, the parameter for determining the transmission waiting data amount D is updated. Therefore, also when acquiring the transmission data requested by the data request query, the process shown in FIG. 11 is executed again. Further, when the reselection time has elapsed since the previous execution of the process in FIG. 11, the process in FIG. 11 is executed again.

Re-executing of the process in FIG. 11 improves the selection accuracy of the communication line. This will be described concretely with reference to FIGS. 13 and 14 in addition to FIG. 12 described above. Note that in the waveform showing the communication speed in the wireless LAN, the peak position is the position of the wireless LAN access point 6.

Figure 13:
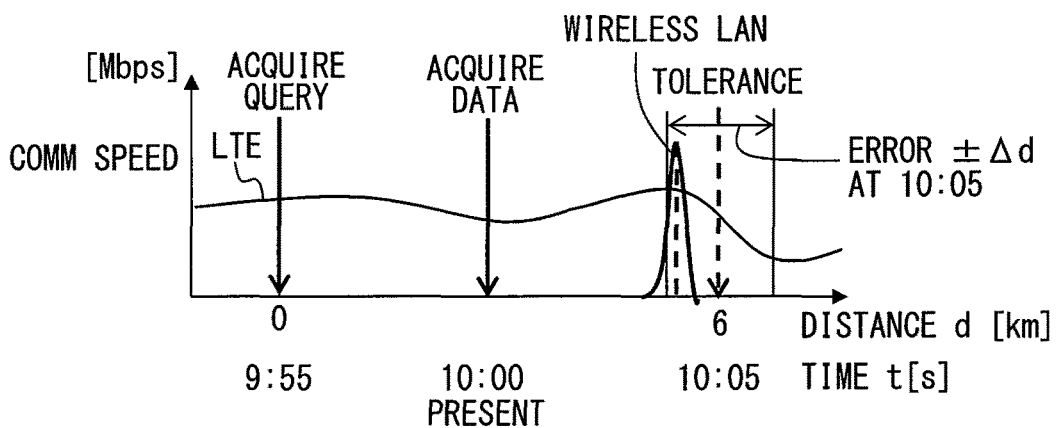
FIG. 13 is a diagram which estimates, at 10:00, an error in distance at the maximum limit time point of a tolerance delay.

FIG. 12 shows 9:55 that is the time at which a data request query is acquired as described above. FIG. 13 is a diagram for explaining the result of executing the process shown in FIG. 11 at the time of 10:00 when the transmission data is acquired.

As shown in FIG. 12, the time of 9:55 as the present time is earlier than the maximum limit time point of the tolerance delay DL by 10 minutes. In contrast, as shown in FIG. 13, the time of 10:00 as the present time is earlier than the maximum limit time point of the tolerance delay DL by 5 minutes. Therefore, the error±Δd of the distance d at 10:05 in FIG. 13 is smaller than that at 10:05 in FIG. 12. The data amount to be transmitted in the communication area 6a of the wireless LAN access point 6 are however still existing within the range of the error Δd of the distance d; the state in which the determination result in S28 is YES thus continues. Even at the time of 10:00, the selection result of the communication line is therefore in the withheld state. Note that since the LTE is not selected, the transmission data is thus not transmitted and is withheld by the mobile terminal 100.

Figure 14:
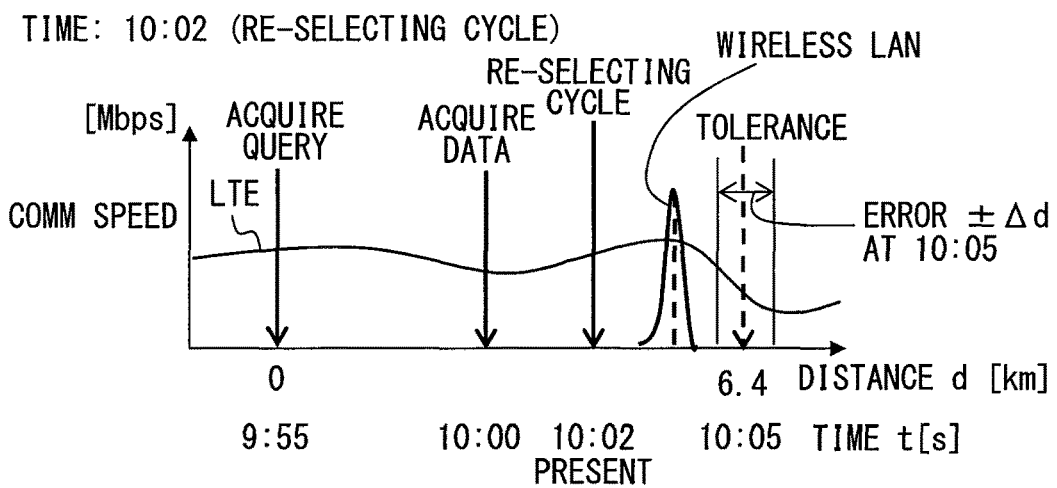
FIG. 14 is a diagram which estimates, at 10:02, an error in distance at the maximum limit time point of a tolerance delay.

FIG. 14 is a diagram for explaining the result of executing the process shown in FIG. 11 at 10:02 after the reselection cycle has elapsed since the process shown in FIG. 11 was executed at 10:00.

In FIG. 14, the time of 10:02 as the present time is closer to the time of 10:05 serving as the maximum limit time point of the tolerance delay DL than the time of 10:00. Therefore, the error±Δd of the distance d at 10:05 is further reduced. As a result, in FIG. 14, the waveform in which the communication speed in the wireless LAN is occurring is out of the range of the error Δd of the distance d. The processing in S29 is thus not withheld, and the use of the communication line selected by the processing in S29 is determined. In this way, by repeatedly executing the process shown in FIG. 11, the selection accuracy of the communication line is improved.

Figure 15:
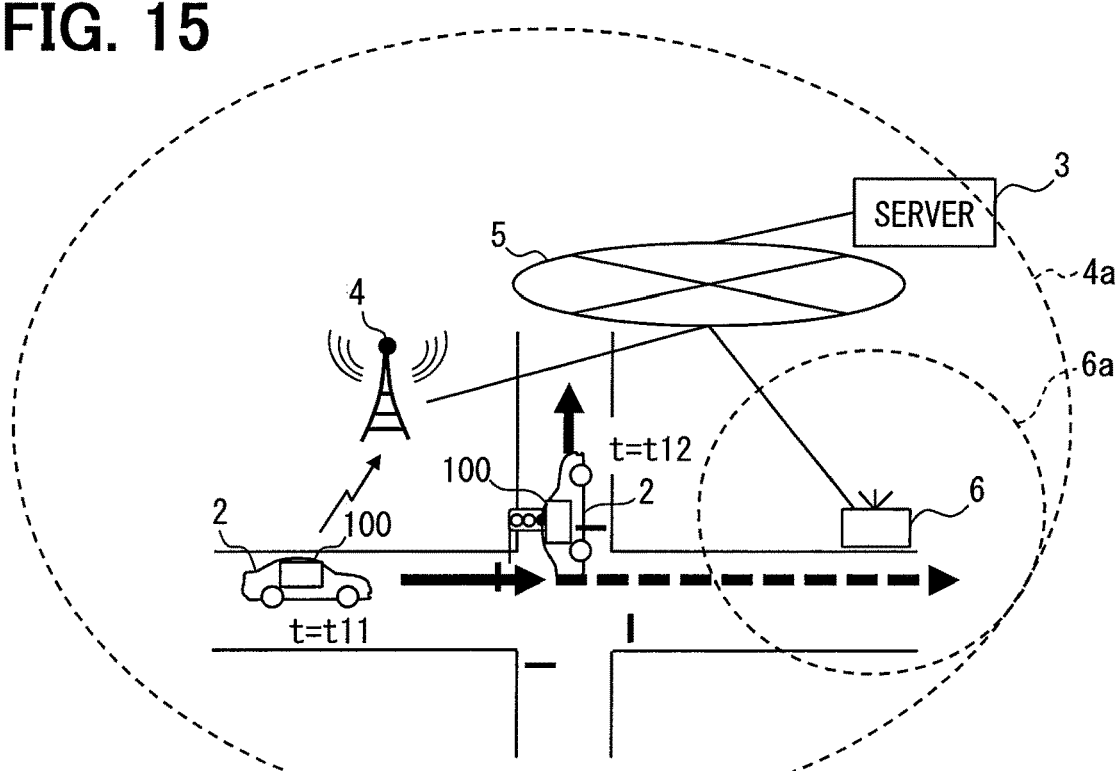
FIG. 15 is a view for explaining another effect of the third embodiment.

Another effect of the third embodiment will be described with reference to FIG. 15. FIG. 15 shows the state of the vehicle 2 as below. At time t11, the vehicle 2 is travelling toward the wireless LAN access point 6; at time t12, the vehicle 2 is turning left at the intersection. This turning of the vehicle 2 changes the predicted travel route; thus, the vehicle 2 is now planned not to pass through the communication area 6a of the wireless LAN access point 6.

In the third embodiment, the process shown in FIG. 11 is re-executed even when the parameter for determining the predicted communication quality is updated. The parameter for determining the predicted communication quality includes a predicted travel route. Therefore, at time t12 when the predicted travel route is changed, the process shown in FIG. 11 is executed again.

At time t11, the transmission data is planned to be transmitted in the communication area 6a of the wireless LAN access point 6. However, at time t12, the communication line that transmits transmission data can be switched to the LTE in accordance with the changed predicted travel route that will not pass through the communication area 6a of the wireless LAN access point 6.

Fourth Embodiment

The first to third embodiments describe the determination as to whether to offload transmission data when transmitting it on uplink. The following will describe a fourth embodiment providing a configuration for determining whether to offload transmission data when transmitting it on downlink.

Figure 16:
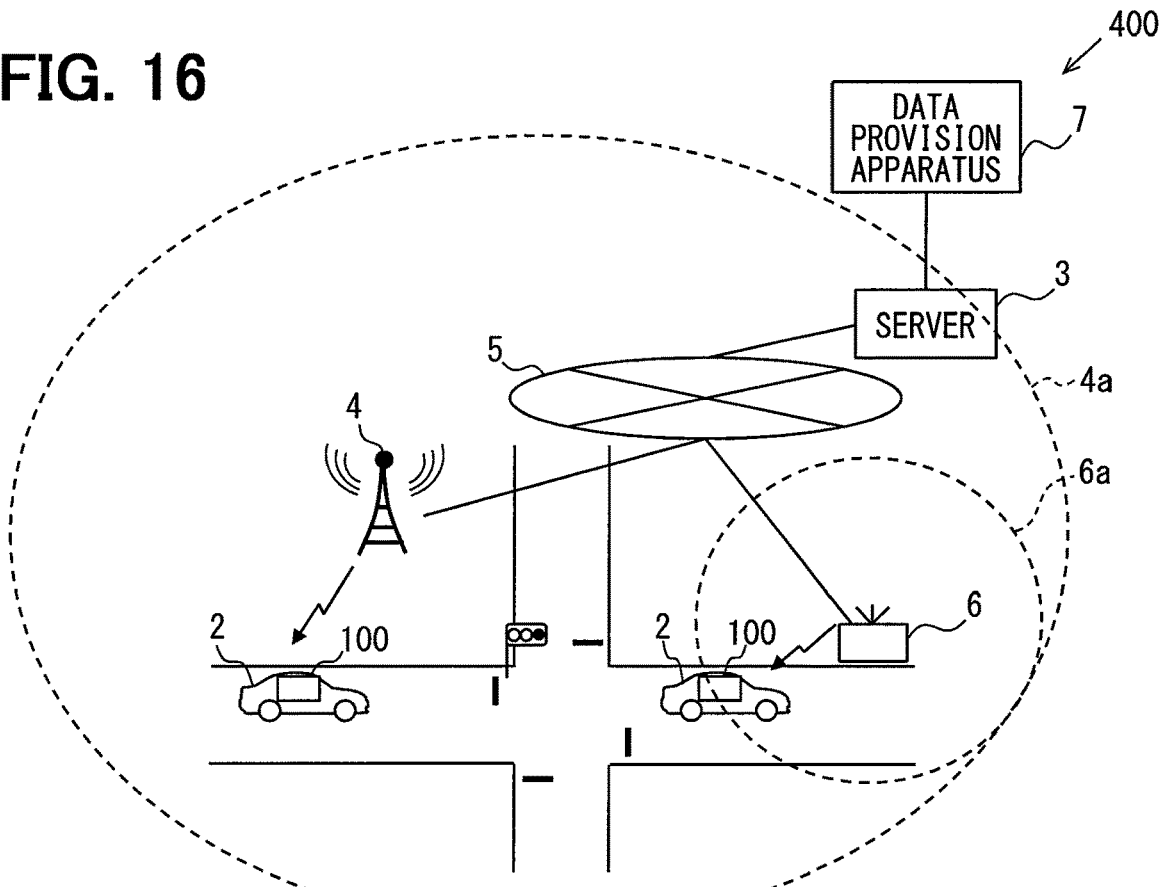
FIG. 16 is a diagram showing a configuration of a communication system according to a fourth embodiment.

FIG. 16 shows a configuration of a communication system 400 according to the fourth embodiment. The communication system 400 further includes a data provision apparatus 7 in addition to the communication system 1 shown in FIG. 1. The data provision apparatus 7 is connected to the server 3 and provides the server 3 with a transmission data to be transmitted to the mobile terminal 100. The mobile terminal 100 periodically transmits, to the server 3, the position of the vehicle 2 on which the mobile terminal 100 is mounted. Further, when determining a predicted travel route, the mobile terminal 100 transmits the predicted travel route to the server 3 periodically or each time of determining and updating it. The server 3, which is a fixed communication apparatus, corresponds to a mobile system communication apparatus in the fourth embodiment.

Figure 17:
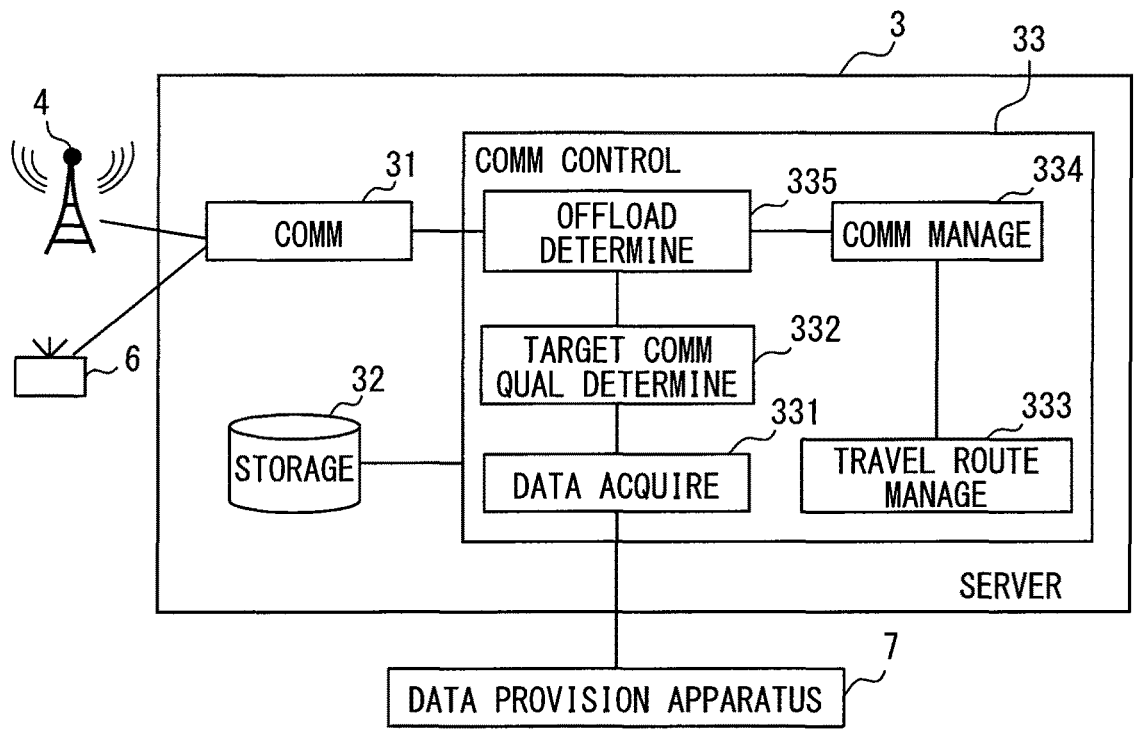
FIG. 17 is a block diagram showing a configuration of a server.

FIG. 17 shows a configuration of the server 3. The server 3 includes a communication unit 31, a storage unit 32, and a communication control circuit 33. The communication unit 31, which is also referred to as a communicator or a transceiver, has (i) a function of communicating with the mobile terminal 100 via the wide area base station 4 and (ii) a function of communicating with the mobile terminal 100 via the wireless LAN access point 6. The storage unit 32, which is also referred to as a storage, temporarily stores a transmission data acquired by the data acquisition section 331 to be described later.

The communication control circuit 33, which is also referred to as a communication controller, performs the functions as the data acquisition section 331, the target communication quality determination section 332, the travel route management section 333, the communication management section 334, and the offload determination section 335.

In the present embodiment, as an example, the communication control circuit 33 is realized by using at least one computer having a CPU, a ROM, a RAM, an I/O, and a bus line connecting these components. The ROM stores a program for causing the computer to function as the communication control circuit 33 or the above sections or the like. The CPU executes the program stored in the ROM while utilizing the temporary storage function of the RAM. When the above-described functions are executed, a method corresponding to the program is executed.

The data acquisition section 331 acquires a transmission data provided by a data provision apparatus 7. The required communication quality of the transmission data is also acquired. The method of acquiring a requested communication quality is the same as the acquisition method of a requested communication quality provided by the data acquisition section 111 of the mobile terminal 100; a requested communication quality may be acquired from the data provision apparatus 7 or may be determined based on the type of transmission data etc., provided by the data provision apparatus 7.

The target communication quality determination section 332 determines a target communication quality based on the requested communication quality acquired by the data acquisition section 331. The processing by the target communication quality determination section 332 is the same as the target communication quality determination section 112 of the mobile terminal 100.

The travel route management section 333 predicts the predicted travel route of the vehicle 2 based on the position of the vehicle 2 that the mobile terminal 100 sequentially transmits. The travel route management section 333, which predicts the same as the travel route management section 113 of the mobile terminal 100, corresponds to a position prediction section like the travel route management section 113.

The communication management section 334 has the same function as the communication management section 114 of the mobile terminal 100. Therefore, the communication management section 334 manages the communication resources of the communication lines that the communication unit 31 can use for communication with the mobile terminal 100, and also manages the relationship between the position and the communication speed for each communication line. In addition, as a function of the communication quality prediction section, the communication management section 334 predicts a predicted communication quality in the case of transmitting the transmission data in the wireless LAN based on the predicted position predicted by the travel route management section 113 and the relationship between the position and the communication speed.

The offload determination section 335 has the same function as the offload determination section 115 of the mobile terminal 100. Therefore, the offload determination section 335 corresponds to a selection section. The offload determination section 335 can adopt Expressions 1, 2, and 3 described in the above embodiments as expressions for offload determination. Then, it is determined whether the expression adopted is fulfilled. When it is determined that the adopted expression is fulfilled, the wireless LAN is selected as the communication line for transmitting the transmission data.

As described in the fourth embodiment, it is possible to select whether or not the transmission data is to be offloaded even in the downlink, by the same processing as the uplink.

Fifth Embodiment

Figure 18:
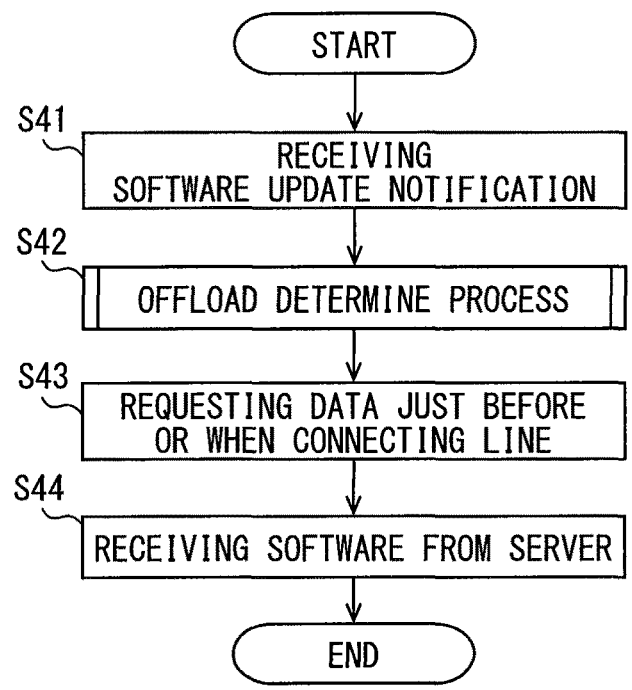
FIG. 18 is a flowchart showing a process executed by a communication control circuit according to a fifth embodiment.

The following will describe a fifth embodiment providing a configuration in which the mobile terminal 100 performs an offload determination when receiving it on downlink with an example in which a transmission data is an update software program. FIG. 18 shows a process executed by the communication control circuit 110 of the mobile terminal 100.

In S41, when the communication unit 101 receives a software update notification which is a notification indicating that an update software program can be downloaded, the communication control circuit 110 acquires such a software update notification from the communication unit 101. The software update notification, which is a query instructing downloading of the update software program, includes the data amount of software program as transmission data and the tolerance delay DL.

In S42, an offload determination process is executed. The offload determination process is the processing shown in any one of FIGS. 8, 9, and 11. When executing any one of FIGS. 8, 9, and 11 in the fifth embodiment, the required communication quality of transmission data is determined based on the software update notification. Since the software update notification includes the data amount and the tolerance delay DL, any one of the processes of FIGS. 8, 9, and 11 can be executed as in the case where the data request query is acquired.

In S43, a data request is transmitted to the server 3 just before or when connecting to the communication line selected by the offload determination process in S42. In S44, the update software program transmitted from the server 3 is received. In this manner, the mobile terminal 100 can make an offload determination also on the downlink.

Sixth Embodiment

The following will describe a sixth embodiment under conditions where at present, LTE can be used, and wireless LAN cannot be used. In the sixth embodiment, the communication management section 114 sets a communication end position in the wireless LAN. The communication end position is set to be a position which the vehicle 2 is predicted to reach earlier than the maximum limit time point of the tolerance delay DL, by at least a period of time during which the transmission data can be transmitted in the LTE. Then, an integrated value S of the communication resource that can be transmitted in the wireless LAN up to the communication end position in the wireless LAN is calculated. The communication end position at which the communication in the wireless LAN is ended may be also said to be a transmission start position Ps in the LTE as described later.

Further, in other words, the communication management section 114 may set a communication end time point in the wireless LAN. The communication end time point is set to be a time point earlier than the maximum limit time point of the tolerance delay DL, by at least a period of time during which the transmission data can be transmitted in the LTE. Then, an integrated value S of the communication resource that can be transmitted in the wireless LAN up to the communication end time point is calculated. The communication end time point at which the communication in the wireless LAN is ended may be also said to be a transmission start time point at which the transmission in the LTE is started.

Further, in the sixth embodiment, the communication control circuit 110 also executes the offload determination process in the following case. That is, in this case, although the wireless LAN has been selected (i.e., it is determined that the offload to the wireless LAN is enabled), the transmission data could not be transmitted in the wireless LAN (hereinafter, offload determination failure). Therefore, in the sixth embodiment, the determination that the communication with an advantageous communication characteristic is failed is regarded as a reselection condition.

Figure 19:
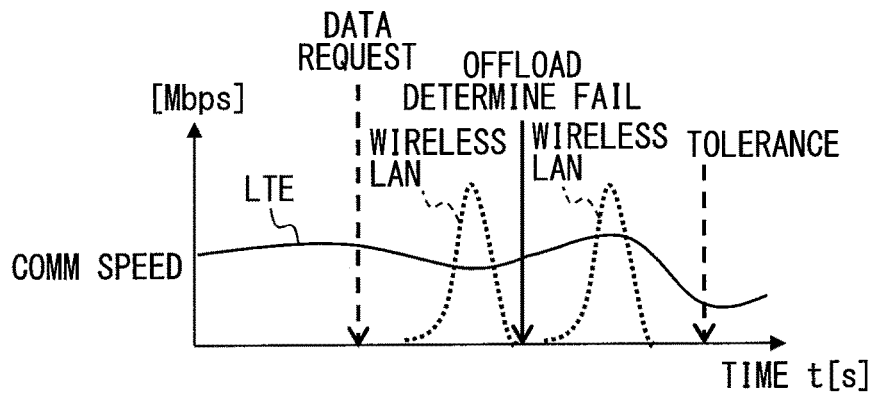
FIG. 19 is a diagram showing a case that there are a plurality of time zones in which a wireless LAN can be used according to a sixth embodiment.

The offload determination failure corresponds to a state in which the vehicle 2 passes through the communication area 6a of the wireless LAN access point 6 without completely transmitting the transmission data although the offload to the wireless LAN was determined to be possible. As shown in FIG. 19, suppose a case that there are a plurality of time zones during which the wireless LAN can be used up to the time before the maximum limit time point of the tolerance delay DL. In such a case, the ending time points of the respective time zones using the wireless LANs correspond to the time points at which the respective offload determination failures are determined.

Figure 20:
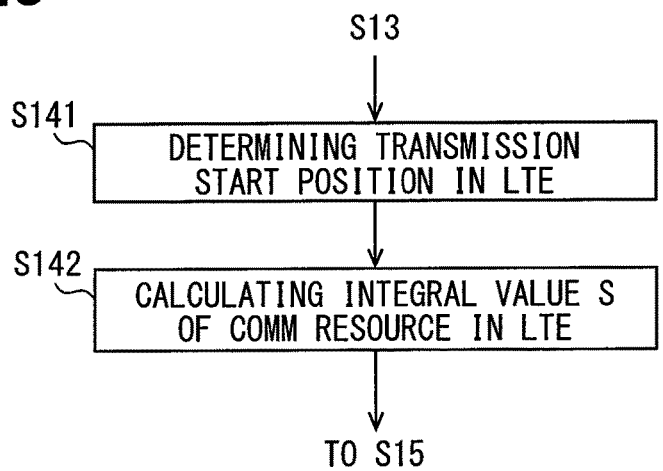
FIG. 20 is a flowchart showing a process executed according to a sixth embodiment, instead of S14.

The offload determination process executed in the sixth embodiment is the same as the process shown in FIG. 9 except for the processing shown in FIG. 20. The processing shown in FIG. 20 is executed in place of S14, in the sixth embodiment. In S141, a transmission start position Ps in the LTE is determined so that when transmitting a transmission data in the LTE, the transmission of the transmission data can be completed with a fixed period of time remaining before the maximum limit time point of the tolerance delay DL.

Figure 21:
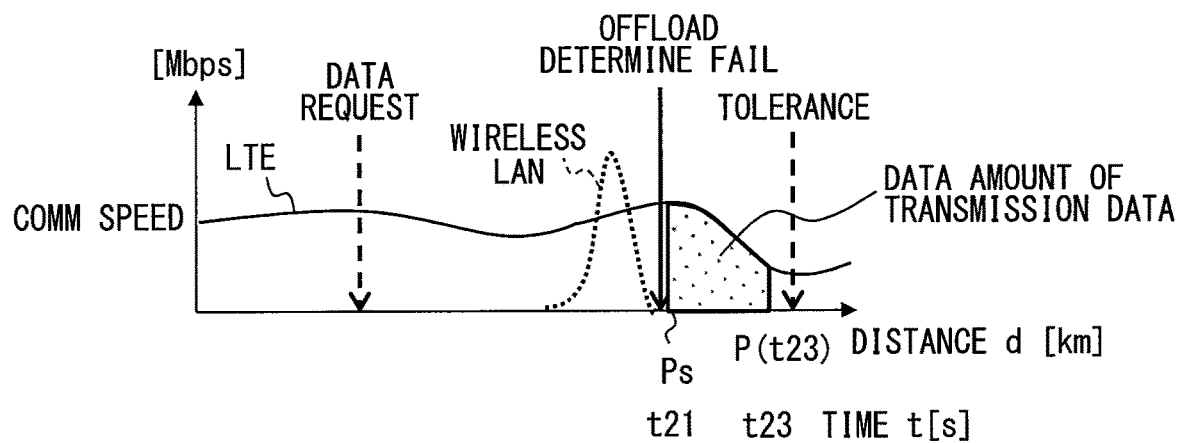
FIG. 21 is a diagram for explaining transmission of transmission data in LTE after an offload determination failure.

The transmission start position Ps is shown in FIG. 21. In contrast, time t23 shown in FIG. 21 is earlier, by a fixed period of time, before the maximum limit time point of the tolerance delay DL. Since the predicted travel route has been acquired, the position P (t23) at time t23 can be determined. In FIG. 21, the horizontal axis represents the distance d. This distance d is a distance from the present position. Since the planned travel route is acquired, the distance d from the present position corresponds to the position P.

Also, since the planned travel route is acquired, the positions at respective times are determined from the planned travel route and the time. Further, the data amount that can be transmitted per time is determined from (i) the relationship of the communication speed at each position shown in FIG. 21 and (ii) the moving speed of the mobile terminal 100. By integrating the data amount that can be transmitted per time, it is possible to calculate the transmission start time t21 in the case where a transmission of a transmission data is made in the LTE and the transmission is ended at time t23. By determining time t21, the transmission start position Ps can be determined. As described above, the transmission start position Ps in the LTE can also be said to be the communication end position in the wireless LAN.

In S142, the integral value S of the communication resource up to the transmission start position Ps in the LTE determined in S141 is calculated.

According to the sixth embodiment, the integral value S of the communication resource up to the transmission start position Ps in the LTE is calculated; when it is determined that the integral value S is larger than the transmission waiting data amount D, the wireless LAN is selected as the communication line in which the transmission data is transmitted. In addition, the offload determination failure is regarded as a condition to re-execute the offload determination process. That is, the offload determination failure is set as the reselection condition.

Under the above, the wireless LAN is selected as the communication line for transmitting the transmission data, but even if the offload determination failure is determined due to some reason, such as radio disturbance, the offload determination process is re-executed at that time point. Even from this time point, the transmission data can be transmitted in the LTE before the maximum limit time point of the tolerance delay DL; thus, the LTE is selected as a communication line for completely transmitting the transmission data before the maximum limit time point of the tolerance delay DL.

Also, even if the offload determination fails, there is a high possibility that the requested communication quality can be satisfied; it is possible to make the wireless LAN line easier to select by lowering the threshold used in S28.

Seventh Embodiment

The following will describe a seventh embodiment in which a part of the transmission data is transmitted in the LTE in advance to prevent an occurrence of the following case. That is, suppose a case that when the communication line is switched to the LTE for transmitting the transmission data after determining that the offload determination is unsuccessful, a part of the transmission data cannot be transmitted before the maximum limit time point of the tolerance delay DL. To prevent such a case, a part of the transmission data is transmitted in the LTE in advance.

Figure 22:
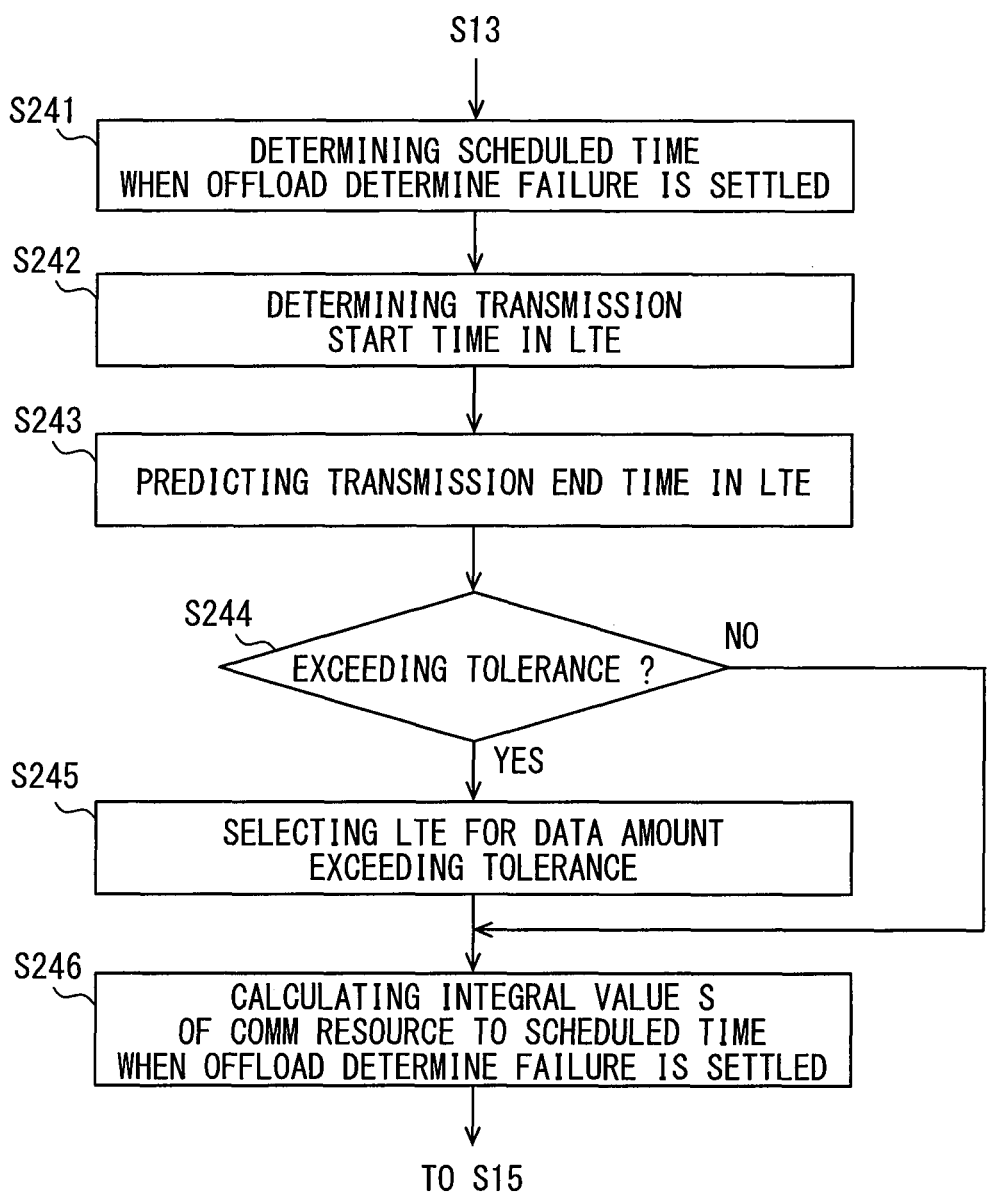
FIG. 22 is a flowchart showing a process executed according to a seventh embodiment, instead of S14.

The offload determination process executed in the seventh embodiment is the process shown in FIG. 9 except for the processing shown in FIG. 22. The processing shown in FIG. 22 is executed in place of S14, in the seventh embodiment. In S241, a scheduled time at which offload determination failure is to be settled down is determined. The scheduled time at which the offload determination failure is to be settled down is a scheduled time to exit from the communication area 6a of the wireless LAN access point 6.

In S242, the transmission start time in the LTE is determined. That is, this time determined in S241 is the time at which the transmission of the transmission data is to be started in the LTE.

Figure 23:
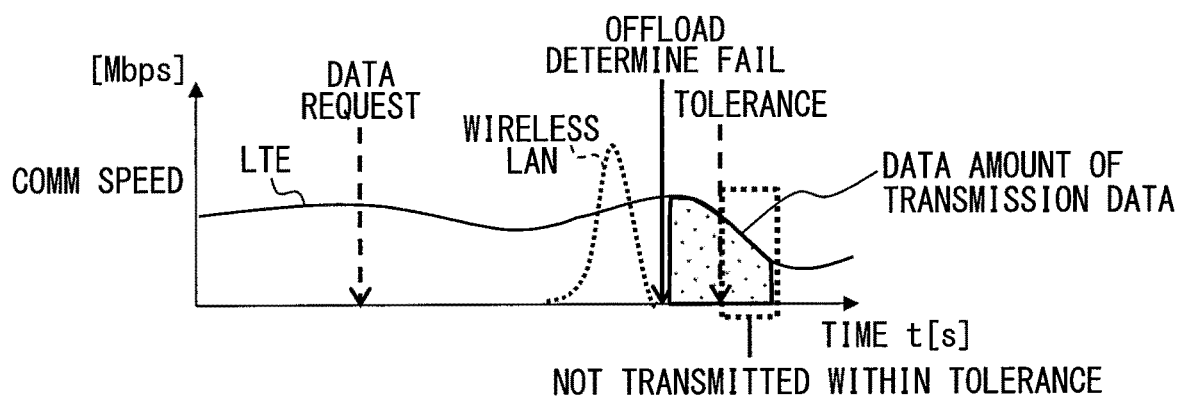
FIG. 23 is a diagram for explaining a determination in S146 of FIG. 22.

In S243, a transmission end time is predicted; the transmission end time is an end time of transmission of transmission data that is started from the time determined in S242. In S244, it is determined whether or not the transmission end time predicted in S243 is after the maximum limit time point of the tolerance delay DL. FIG. 23 shows a diagram for explaining the determination in S244. The state shown in FIG. 23 indicates that a part of the transmission data cannot be transmitted before the maximum limit time point of the tolerance delay DL in cases that the transmission of the transmission data is started in the LTE after the offload determination fails.

Figure 24:
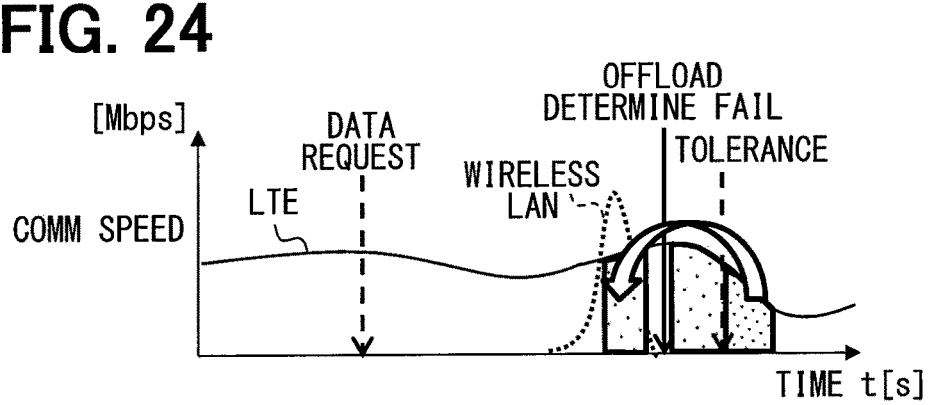
FIG. 24 is a diagram for explaining a process in S147 of FIG. 22.

When the determination result in S244 is YES, the process proceeds to S245. In S245, it is determined that the data amount that is predicted to be transmitted after the maximum limit time point of the tolerance delay DL is transmitted by selecting the LTE as the communication line. As a result, the data amount predicted to be transmitted after the maximum limit time point of the tolerance delay DL corresponds to the transmission data transmitted in LTE irrespective of offload determination failure. Therefore, as shown in FIG. 24, the data amount predicted to be transmitted after the maximum limit time point of the tolerance delay DL is to be transmitted in the LTE before it is determined that the offload determination is unsuccessful. Doing this enables the transmission data to be completely transmitted up to the maximum limit time point of the tolerance delay DL in cases that the remaining transmission data is transmitted in the LTE after the offload determination fails.

After S245 is executed, the process proceeds to S246. On the other hand, when the determination result in S244 is NO, the process directly proceeds to S246. In S246, the integral value S of the communication resource up to the scheduled time when the offload determination failure is settled down is calculated.

Eighth Embodiment

The following will describe an eighth embodiment that considers the error Δd of the position at which the vehicle 2 arrives at the maximum limit time point of the tolerance delay DL in a method different from that in the third embodiment. In the third embodiment, the offload determination is made on the supposition that up to the maximum limit time point of the tolerance delay DL, the vehicle 2 is predicted to reach a position that is farther, by the error Δd of the position at which the vehicle 2 arrives at the maximum limit time point of the tolerance delay DL, from the position without any error Δd being considered.

On the other hand, in the eighth embodiment, it is supposed that up to the maximum limit time point of the tolerance delay DL, the vehicle 2 is predicted to reach a position that is set to be closer to (i.e., short of), by the error Δd of the position at which the vehicle 2 arrives at the maximum limit time point of the tolerance delay DL, from the position without any error Δd being considered. Then, the integral value S of the communication resource is calculated with the communication resources available up to the set position.

Figure 25:
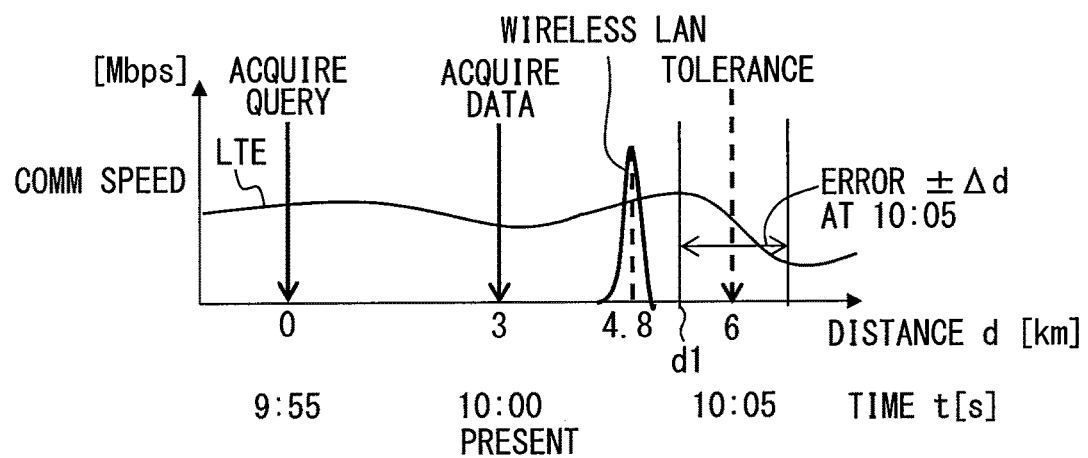
FIG. 25 is a diagram showing a position by an error in distance short of a position at the maximum limit time point of a tolerance delay according to an eighth embodiment.

FIG. 25 shows a position dl of an example of a position that is located the error Δd short of the position of the vehicle 2 at the maximum limit time point of the tolerance delay DL without any error Δd. In the example of FIG. 25, the integrated value S of the communication resource is calculated on the assumption that the communication resource that can be used before the maximum limit time point of the tolerance delay DL is the communication resource taking place closer to the present position than the position dl. The eighth embodiment is the same as the third embodiment except that the calculation method of the integral value S of the communication resource is different.

According to the eighth embodiment, the integral value S of the communication resource is calculated while leaving a margin corresponding to the error Δd. The integrated value S of this communication resource is compared with the transmission waiting data amount D; this can prevent an occurrence of an unintended event that disables the offload and exceeds the tolerance delay DL (that is, not satisfying the communication quality of the transmission data).

Ninth Embodiment

Figure 26:
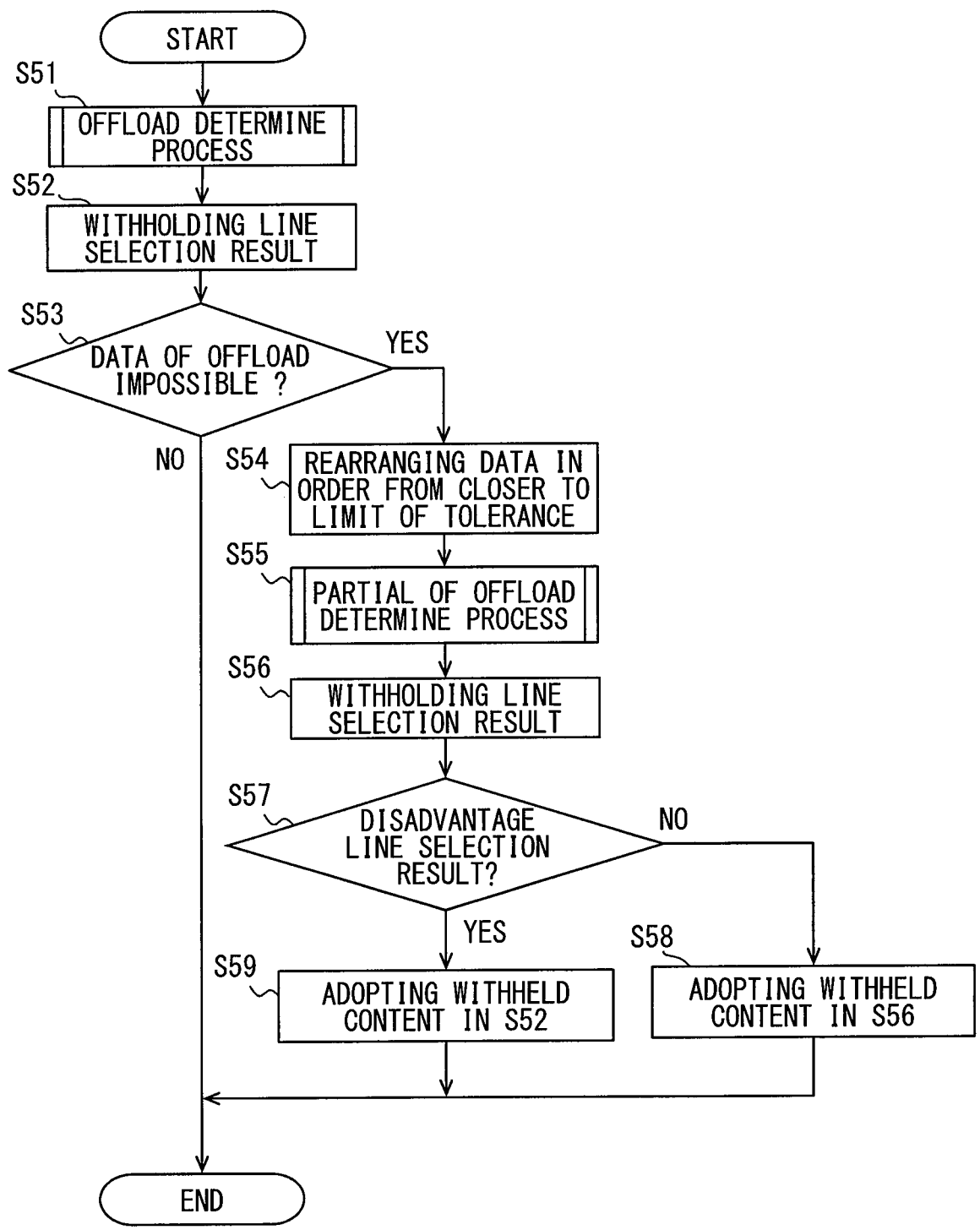
FIG. 26 is a flowchart showing a process executed according to a ninth embodiment, instead of a process shown in FIG. 11.

The following will describe a ninth embodiment in which the communication control circuit 110 executes a process shown in FIG. 26 instead of the process shown in FIG. 11. In S51, an offload determination process is executed. The offload determination processing executed in S51 is all the process shown in FIG. 11. By executing S51, when there are several types of transmission data, a communication line for transmitting transmission data is selected in descending order of priority with respect to each type of transmission data.

In S52, the line selection result obtained by executing S51 is withheld. In S53, it is determined whether there is transmission data that is not offloadable (i.e., whether there is transmission data to be transmitted in the LTE), in the line selection result withheld in S52. When the determination result in S53 is NO, the process shown in FIG. 26 is ended with the line selection result withheld in S52 intact.

Incidentally, in S53, in addition to determining whether there is transmission data that is not offloadable, the following determination may be made. That is, all the maximum limit time points of the tolerance delays DLs of all the transmission data may be compared with each other to find a subject transmission data having the latest maximum limit time point of the tolerance delay DL. It may be determined whether the integral value S of the communication resource of the wireless LAN up to the latest maximum limit time point of the tolerance delay DL is larger than the data amount of the offload impossible data. In this case, when the latter determination result also becomes YES, the determination result in S53 is YES.

When the determination result in S53 is YES, the process proceeds to S54. In S54, the several transmission data are rearranged in the order from the transmission data having the closer maximum limit time point of the tolerance delay DL (that is, the order from the transmission data having the earlier maximum limit time point of the tolerance delay DL).

In S55, out of all the offload determination processing shown in FIG. 11, the processing after rearranging the transmission waiting data is executed in the order of rearrangement in S54. In S56, the line selection result obtained by executing S55 is withheld.

In S57, the line selection result withheld in S56 is compared with the line selection result withheld in S52. Then, it is determined whether there is transmission data that is disadvantageous in the line selection result withheld in S56. In other words, it is determined whether the line selection result withheld in S56 is the same as or advantageous to the line selection result withheld in S52 with respect to all types of transmission data.

When the determination result in S57 is NO, the process proceeds to S58. In S58, it is determined to adopt the withheld contents in S56. When the determination result in S57 is YES, the process proceeds to S59. In S59, it is determined to adopt the determination result in S52.

Figure 27:
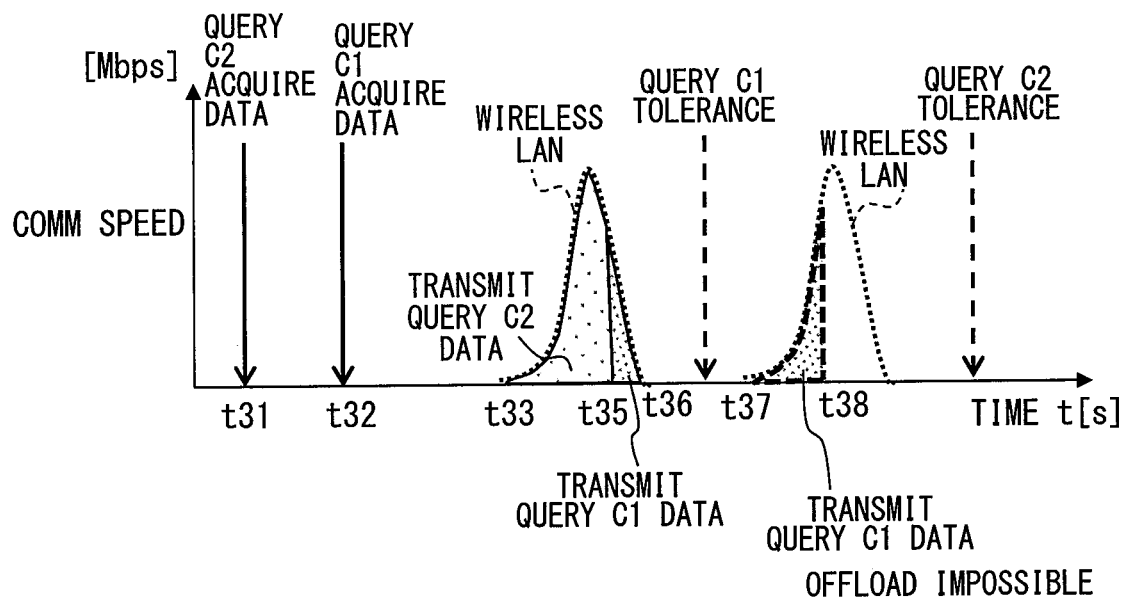
FIG. 27 is a diagram for explaining contents of processing in S51 of FIG. 26.

The effect of executing FIG. 26 will be described with reference to FIGS. 27 and 28. FIG. 27 is a diagram for explaining the contents of the processing in S51. FIG. 27 shows that the transmission data (hereinafter referred to as query C2 data) requested by the query C2 is acquired at time t31 and that the transmission data (hereinafter referred to as query C1 data) requested by the query C1 is acquired at time t32.

By executing the process of FIG. 26 at time t31, the query C2 data is scheduled to be transmitted from time t33 to time t35 by using the wireless LAN. FIG. 26 is a process to be executed instead of FIG. 11; thus, when new transmission data is acquired, FIG. 26 is re-executed.

At time t32, a query C1 data is acquired. Thereby, the process in FIG. 26 is executed again. At this time, if the query C2 data has a higher priority than the query C1 data, the wireless LAN is allocated to the query C2 data from time t33 to time t35.

Thereafter, the communication resource of the wireless LAN not yet allocated is allocated to the query C1 data. Therefore, for the query C1 data, the communication resource of the wireless LAN from time t35 to time t36 is allocated. However, the communication resource of the wireless LAN from time t35 to time t36 cannot transmit all of the query C1 data. If the communication resource of the wireless LAN from time t37 to time t38 is also used, it is possible to transmit all of the query C1 data.

However, the time frame from time t37 to time t38 is after the maximum limit time point of the tolerance delay DL defined in the query C1. Therefore, offloading is determined to be impossible. When proceeding to the determination in S53 in this state, the determination result in S53 becomes YES and S54 is thus executed.

In the case of executing S54, the transmission data is rearranged in order of the maximum limit time point of the tolerance delay DL from closer to further. In the examples of FIGS. 27 and 28, since the maximum limit time point of the tolerance delay DL of the query C1 data is closer than that of the query C2 data, the processing in S55 is executed on the query C1 data.

Figure 28:
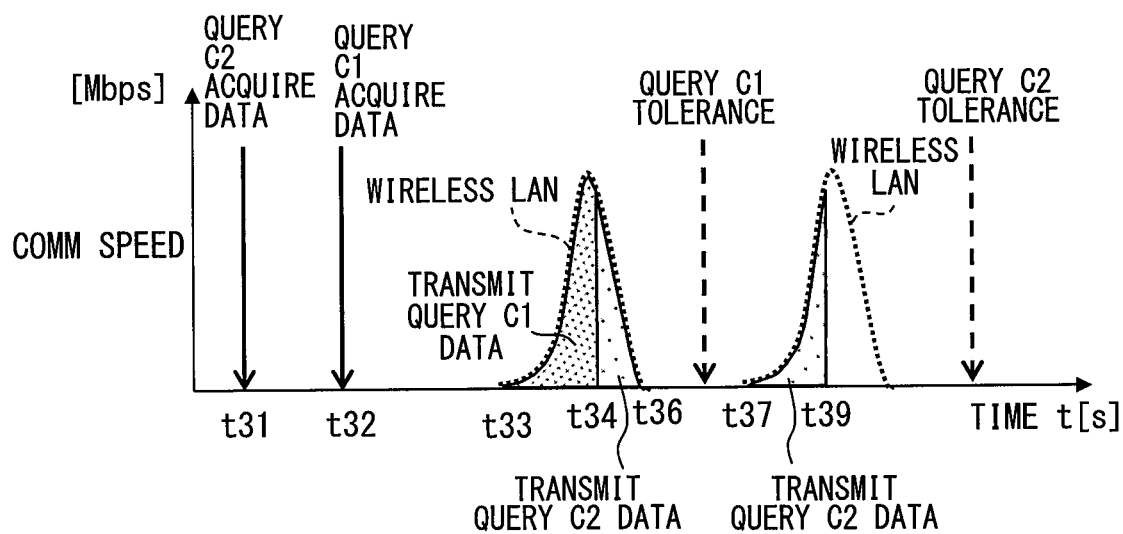
FIG. 28 is a diagram for explaining contents of processing in S55 of FIG. 26.

As a result, as shown in FIG. 28, the communication resource of the wireless LAN from time t33 to time t34 is allocated to the query C1 data. Therefore, the communication resource of the wireless LAN from time t34 to time t36 and the communication resource of the wireless LAN from time t37 to time t39 are allocated to the query C2 data.

The time frame from time t37 to time t39 is after the maximum limit time point of the tolerance delay DL defined in the query C1, but before the maximum limit time point of the tolerance delay DL defined in the query C2. Therefore, by executing S55, both the query C1 data and the query C2 data can be transmitted using the wireless LAN while satisfying the required communication quality.

Tenth Embodiment

The following will describe a tenth embodiment. In the embodiments so far, the communication characteristics are communication lines, specifically LTE and wireless LAN; the advantageous communication characteristic is wireless LAN. In the tenth embodiment, the communication characteristic is a modulation scheme, and the index is a communication speed. The advantageous communication characteristic is a modulation scheme in which the communication speed is relatively fast. For example, if the modulation schemes are QPSK and 64QAM, 64QAM is an advantageous modulation scheme as an advantageous communication characteristic. In LTE, the modulation scheme and the radio field intensity are correlated with each other; when the radio field intensity is strong, a modulation scheme with a high communication speed is adopted. Therefore, the index can also be considered as the radio field intensity. The radio field intensity is represented by, for example, RSRP (Reference Signal Received Power).

Figure 29:
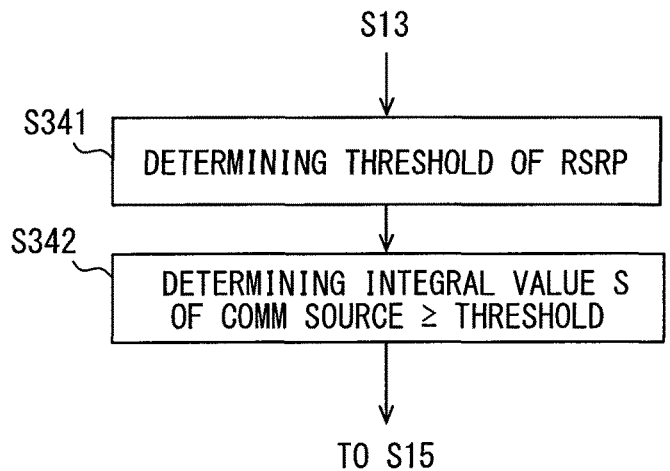
FIG. 29 is a flowchart showing a process executed according to a tenth embodiment, instead of S14.

The offload determination process executed in the tenth embodiment is the same process as that shown in FIG. 9 except for the processing shown in FIG. 29. The processing shown in FIG. 29 is executed in place of S14, in the tenth embodiment. In S341, a threshold value of RSRP is determined. The RSRP threshold can be determined from the RSRP that can communicate in an advantageous modulation scheme. Further, the threshold value may be determined so that the integral value S of the communication resource exceeding the threshold value before the maximum limit time point of the tolerance delay DL becomes equal to the data amount D of the transmission waiting data. Further, a first value may be determined so that the integral value S of the communication resource before the maximum limit time point of the tolerance delay DL and the data amount of the transmission waiting data become equal; then a second value obtained by multiplying the determined first value by a coefficient smaller than 1 may be used as the threshold value.

Figure 30:
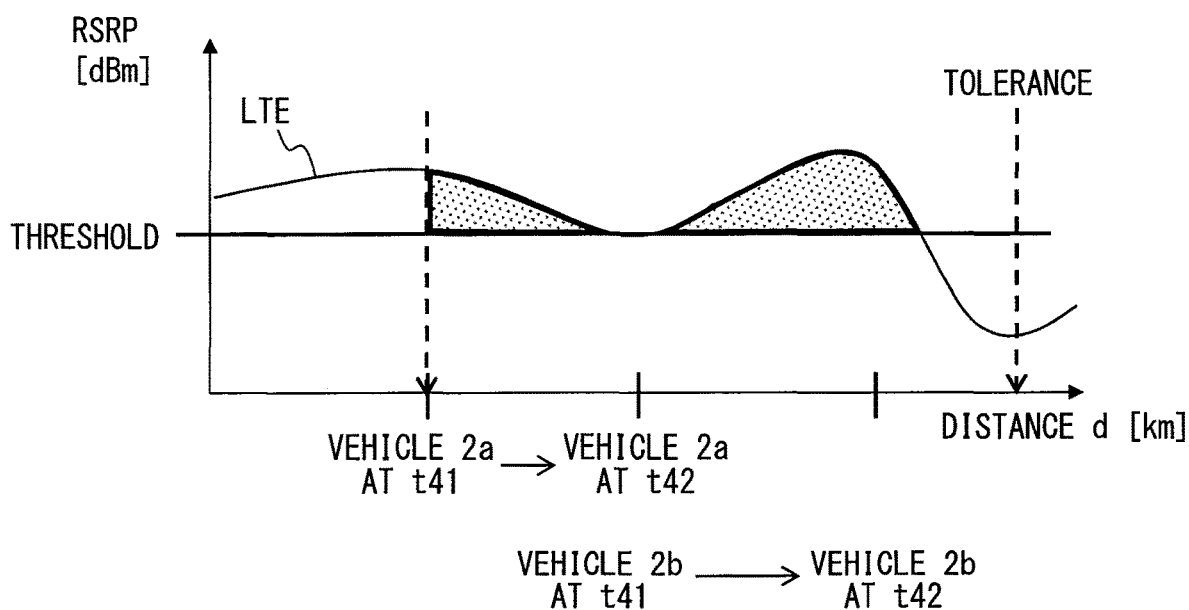
FIG. 30 is a diagram showing a relationship between a distance and RSRP.

In S342, the integral value S of the communication resource whose RSRP is equal to or larger than the threshold value before the maximum limit time point of the tolerance delay DL is calculated. FIG. 30 shows the relationship between the distance d and RSRP. This relationship may be determined by statistical processing, or may be the present value if present value can be acquired. The threshold value is also shown in FIG. 30. The communication speed is determined based on the RSRP. It is thus possible to calculate the integral value S of the communication resource whose RSRP is not less than the threshold value before the maximum limit time point of the tolerance delay DL based on the relationship shown in FIG. 30.

The integrated value of the communication resource calculated in this way is compared with the transmission waiting data amount D in S15.

Figure 31:
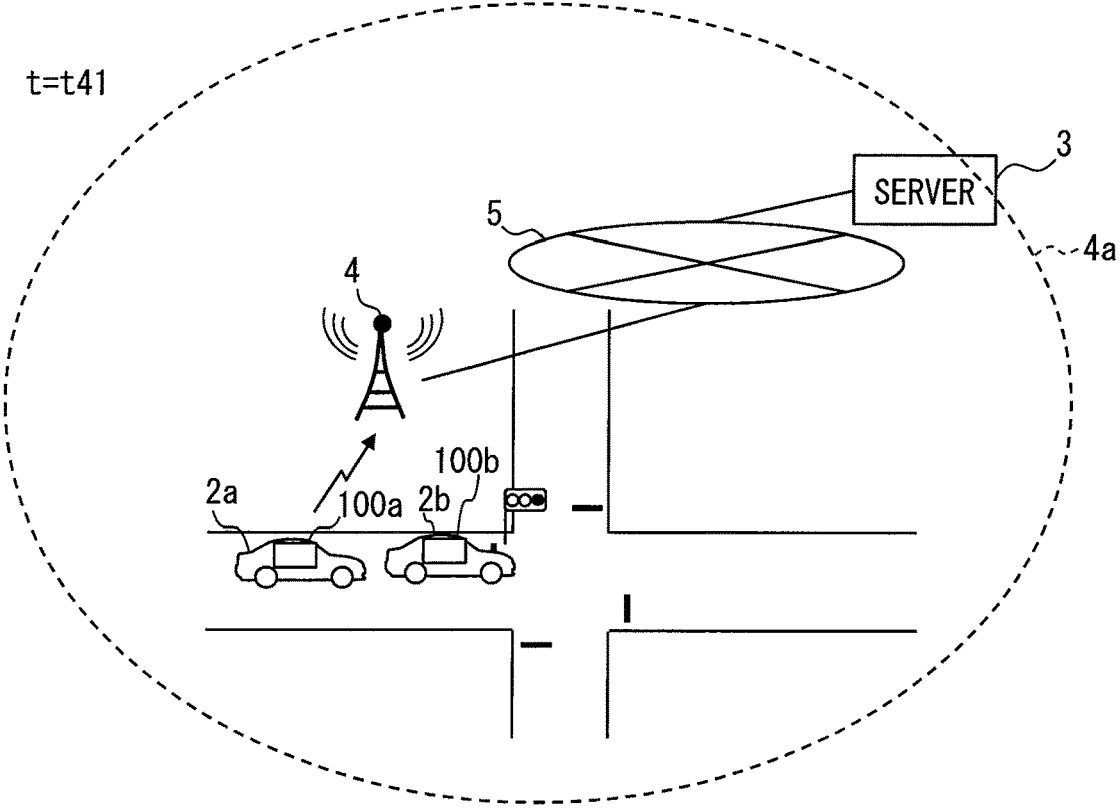
FIG. 31 is a diagram showing positions of vehicles at time t41.
Figure 32:
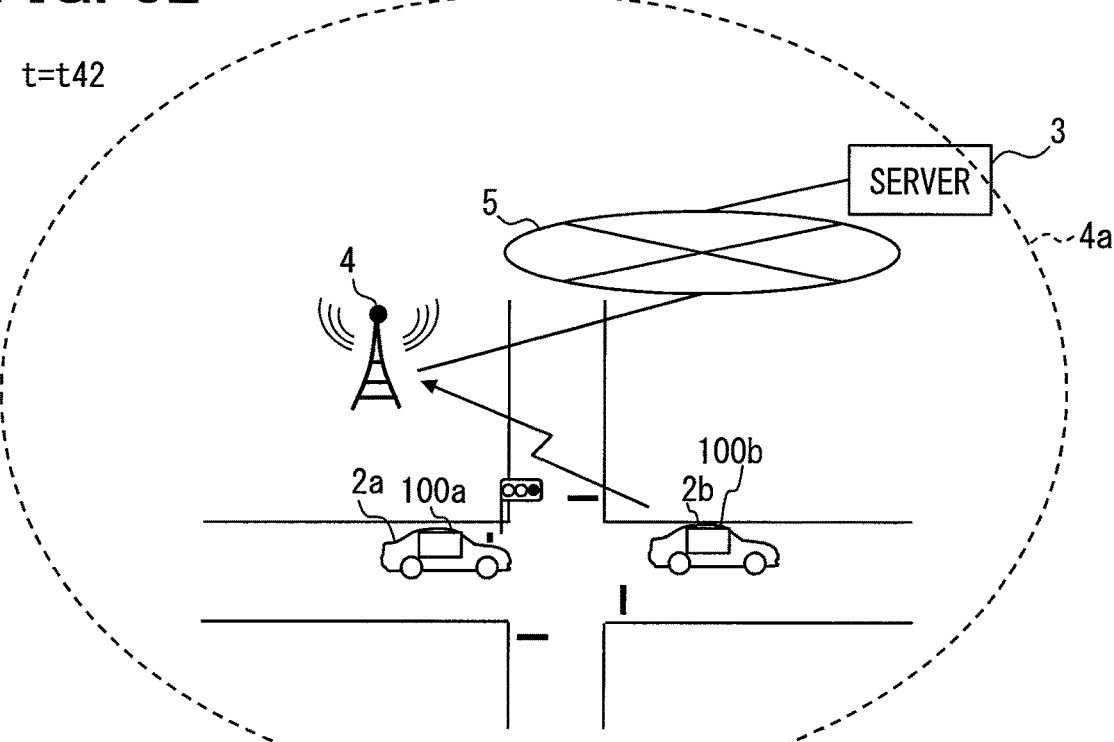
FIG. 32 is a diagram showing positions of vehicles at time t42.

An application example of this tenth embodiment will be described with reference to FIGS. 30, 31, and 32. FIG. 31 shows the positions of the vehicles 2a and 2b at time t41. Mobile terminals 100a and 100b are mounted on these vehicles 2a and 2b, respectively. These mobile terminals 100a and 100b are mobile terminals to which the tenth embodiment is applied. FIG. 32 shows the positions of the vehicles 2a and 2b at time t42.

The positions of the vehicles 2a and 2b at time t41 and time t42 are also shown in FIG. 30. In the vehicle 2a, RSRP at time t41 exceeds the threshold value. At time t42, RSRP falls below the threshold value. However, the vehicle 2a can transmit the transmission data so far.

On the other hand, in the vehicle 2b, the RSRP at time t41 is lower than the threshold value. Therefore, transmission data is not transmitted at time t41. Note that before the maximum limit time point of the tolerance delay DL, there is a period of time during which the RSRP exceeds the threshold such as time t42. By transmitting the transmission data during such a period of time, it is possible to transmit the transmission data before the maximum limit time point of the tolerance delay DL with the RSRP exceeding the threshold.

That is, in both of the vehicles 2a and 2b, even if selection is made to limit the road segment to be communicated in the road segment where the RSRSP exceeds the threshold value, it is possible to transmit the transmission data while satisfying the tolerance delay DL.

First Modified Example

In the above embodiments, a communication line is exemplified as one of the communication characteristics. The communication line includes a wide area communication line and a narrow area communication line as examples. Since the wide area communication line and the narrow area communication line are different in communication cost, they can be regarded as a high cost line and a low cost line. In this case, the index is a cost, and a low cost line is an advantageous communication line.

The difference in the characteristics of the communication line is not limited to this. The difference in characteristics of the communication line may be a high speed line and a low speed line. In this case, the index is the communication speed and the high speed line is an advantageous communication line. Also, the difference in characteristics of the communication line may be a high reliability line and a low reliability line. In this case, the index is the reliability, and the high reliability line is an advantageous communication line. Further, the characteristics of the communication line may be a line having a large remaining capacity up to a communication restriction and a line having a small remaining capacity up to a communication restriction. In this case, the index is the remaining capacity, and the line with the large remaining capacity is an advantageous communication line. Also, the differences in characteristics of the communication line may be a busy line and an unbusy line. In this case, the index is a congestion degree of the line, and the unbusy line is an advantageous communication line. Further, the characteristics of the communication line may be a line having a high point earning application rate and a line having a low point earning application rate. In this case, the index is the point earning application rate, and the line having the high point earning application rate is an advantageous communication line.

Second Modified Example

The mobile communication apparatus is not limited to the one used in the vehicle 2 traveling on roads. The mobile communication apparatus may be used in a train. When used in a train, the predicted position can be predicted based on the schedule of operation (that is, the movement plan) and the delay information.

Third Modified Example

Instead of the above-mentioned priority, the data value may be used and the process shown in FIG. 11 may be executed in descending order of the data value.

Fourth Modified Example

When each of Expressions 1, 2, and 3 is not fulfilled, a part of the transmission data, for example, the data amount of the integral value S of the communication resource may be offloaded.

Fifth Modified Example

Also in the first embodiment and the second embodiment, when the reselection condition is fulfilled, the offload determination process may be executed again.

As the above, the embodiments and the modified examples of the present disclosure have been described to be included in the technical scope of the present disclosure. The present disclosure need not be limited to the above embodiments or the modified examples; furthermore, various modifications other than the embodiments and the modified examples can be made without departing from the gist.

It is noted that additional description relating to a configuration of a control circuit is made below. Although the above embodiments describe a configuration of a control circuit (i.e., the communication control circuit 110 and the communication control circuit 33), another configuration of such a control circuit may be employed, as summarized below.

A control circuit, which may be also referred to as a controller or an electronic control unit, may further include an interface communicating with an external apparatus, a storage, and an internal communication line connecting the foregoing components to each other and may be combined with another control circuit.

Such a control circuit provides a plurality of functions and may include sections to provide the respective functions In addition, the flowcharts (described above) executed by a control circuit similarly include sections, e.g., each represented as S1 in FIG. 8. Such sections may be included in not only a control circuit but also may be divided to be included in two or more control circuits (i.e., included in at least one control circuit). Several sections may be combined into a single section; one section may be divided into several sections. Each section may be also referred to or achieved as a processor, device, module, or the like.

Furthermore, an individual one of the sections, processors, or the like included in at least one control circuit, or an individual control circuit of the at least one control circuit may be achieved by using or by including (i) at least one hardware circuit including analog circuit and/or digital circuit, or (ii) at least one processing unit such as a CPU in a computer along with memory storing instructions as a non-transitory tangible computer-readable storage medium storing instructions of program executed by the CPU, or (iii) a combination of the at least one hardware circuit and the at least one processing unit along with memory storing instruction, to thereby provide the functions.

For reference to further explain features of the present disclosure, a comparative technique is described as follows. There is a comparative method for improving an offload effect. Such a comparative method estimates an offload effect occurring on a wireless network by selecting each of a plurality of wireless bearers based on a list of base stations connected by the plurality of wireless bearers. Based on the estimated offload effects, one of wireless bearers is selected, as a bearer which should transmit traffic, from the plurality of wireless bearers.

The comparative method does not select an unconnected wireless line. Suppose a case where a wireless LAN as a wireless line capable of further improving an offload effect is not available at the present position. In such a case, a selection to improve an offload effect by using the wireless LAN cannot be made even if going to enter the position where the wireless LAN is available.

As described above, a mobile communication apparatus used in a mobile object may not be located presently at a position where a wireless LAN as a wireless line capable of further improving an offload effect is not available, but may be scheduled to enter the position where the wireless LAN is available.

Also, if a mobile communication apparatus as a communication partner will enter a position where the wireless LAN is available, a fixed communication apparatus that communicates with the mobile communication apparatus can also communicate with the mobile communication apparatus after the mobile communication apparatus enters a position where the wireless LAN can be used, to thereby further improve an offload effect. However, according to the comparative method, even a fixed communication apparatus whose communication partner is a mobile communication apparatus is not enabled to make a selection to improve an offload effect by using the wireless LAN.

Also, not limited to the case of aiming at an offload effect, there is a case that the movement of the mobile communication apparatus allows the communication by using another communication characteristic more advantageous in various indices than the present communication characteristic. Therefore, without being limited to the case of aiming at enhancing an offload effect, it may be desirable that communication be performed by using the communication characteristic more advantageous in various indices than the present communication characteristic.

Note that the required communication quality is usually fixed. The requested communication quality includes a tolerance delay. The reason why the tolerance delay is fixed is that the data typically need to be communicated within a predetermined communication period of time. In the case where the required communication quality is fixed, it is desirable to satisfy the required communication quality even when selecting an advantageous communication characteristic.

It is therefore desired to provide a mobile system communication apparatus capable of transmitting data with advantageous communication characteristics while satisfying a required communication quality.

Aspects of the disclosure described herein are set forth in the following clauses.

According to a first aspect, a mobile system communication apparatus, which is either (i) a mobile communication apparatus used in a mobile object or (ii) a fixed communication apparatus communicating with the mobile communication apparatus, is provided to include the following: a position prediction section configured to predict a predicted position of the mobile communication apparatus; a data acquisition section configured to acquire (i) a transmission data and (ii) a requested communication quality that is a communication quality requested to the transmission data, the requested communication quality including a tolerance delay of the transmission data; a target communication quality determination section configured to determine a target communication quality that is a target of a communication quality based on the requested communication quality acquired by the data acquisition section; a communication quality prediction section configured to predict a predicted communication quality that is a communication quality predicted when communicating with an advantageous communication characteristic that is a communication characteristic more advantageous than a present communication characteristic in respect of a predetermined index, based on (i) the predicted position predicted by the position prediction section and a correspondence relationship between a position and a communication characteristic used by the mobile communication apparatus; and a selection section configured to perform a selection of either (i) transmitting the transmission data with the present communication characteristic or (ii) transmitting the transmission data with the advantageous communication characteristic, based on a result of comparison between the target communication quality determined by the target communication quality determination section and the predicted communication quality predicted by the communication quality prediction section.

According to the first aspect, the mobile system communication apparatus compares (i) the target communication quality determined from the required communication quality of the transmission data and (ii) the predicted communication quality in the advantageous communication characteristic determined based on the predicted position, and selects whether or not to transmit transmission data with the advantageous communication characteristic. This configuration makes it easy to transmit the transmission data with the advantageous communication characteristic while satisfying the required communication quality.

In addition, according to a second aspect, a mobile system communication apparatus may be provided by including at least one communication control circuit which includes the sections recited in the mobile system communication apparatus according to the first aspect.

Further, as an optional aspect of the second aspect, an individual communication control circuit of the at least one communication control circuit may be configured to include (i) at least one hardware circuit, or (ii) a central processing unit along with memory storing instructions, or (iii) at least one combination of (a) the at least one hardware circuit and (b) the at least one central processing unit along with memory.

In other words, as another optional aspect of the second aspect, the communication control circuit may be configured by using at least one processor, an individual processor of the at least one processor being configured to include (i) at least one hardware circuit, or (ii) at least one central processing unit along with memory storing instructions, or (iii) a combination of (a) the at least one hardware circuit and (b) the at least one central processing unit along with memory.

What is claimed is:

1. A mobile system communication apparatus that is either (i) a mobile communication apparatus used in a mobile object, or (ii) a fixed communication apparatus communicating with the mobile communication apparatus, comprising at least one communication control circuit configured to:
   predict a predicted position, in which the predicted position is a future position of the mobile communication apparatus;
   acquire (i) a transmission data, (ii) a data amount of the transmission data, and (iii) a requested communication quality that is a communication quality requested to the transmission data, the requested communication quality including a tolerance delay of the transmission data;
   determine a target communication quality that is a target of a communication quality based on the requested communication quality;
   predict a predicted communication quality that is a communication quality predicted when communicating with an advantageous communication characteristic that is a communication characteristic more advantageous than a present communication characteristic in respect of a predetermined index, based on (i) the predicted position, and (ii) a correspondence relationship between a position and a communication characteristic used by the mobile communication apparatus; and perform, under a condition where the present communication characteristic is available but the advantageous communication characteristic is unavailable, a selection of either
(i) transmitting the transmission data with the present communication characteristic, or
(ii) transmitting the transmission data with the advantageous communication characteristic in response to the mobile communication apparatus reaching the predicted position where the advantageous communication characteristic is available without using the present communication characteristic,
by determining whether the data amount of the transmission data is to be transmitted before a maximum limit time point of the tolerance delay based on a result of comparison between the target communication quality and the predicted communication quality, wherein:
the at least one communication control circuit acquires a data request for requesting the transmission data;
in cases of acquiring the data request, the at least one communication control circuit estimates a period of time to acquire the transmission data requested by the data request and a data amount of the transmission data to be acquired, and acquires the requested communication quality of the transmission data requested by the data request; and
the at least one communication control circuit
determines the target communication quality based on the requested communication quality determined for the transmission data requested by the data request, and
predicts the predicted communication quality based on the data amount of the transmission data to be acquired and a period of time during which the transmission data is estimated to be acquired.

2. The mobile system communication apparatus according to claim 1, wherein
the at least one communication control circuit further performs a re-selection that re-executes the selection when a reselection condition is fulfilled.

3. The mobile system communication apparatus according to claim 2, wherein
the at least one communication control circuit includes, as the reselection condition, a fact that a reselection period of time has elapsed since the selection was executed.

4. The mobile system communication apparatus according to claim 2, wherein
the at least one communication control circuit includes, as the reselection condition, a fact that a parameter determining at least either the target communication quality or the predicted communication quality is updated.

5. The mobile system communication apparatus according to claim 2, wherein
the at least one communication control circuit includes, as the reselection condition, a fact that it is determined that a communication with the advantageous communication characteristic was unable to be performed.

6. The mobile system communication apparatus according to claim 1, wherein
the at least one communication control circuit predicts the predicted communication quality by reflecting an error of a parameter determining the predicted communication quality.

7. The mobile system communication apparatus according to claim 1, wherein:
the index changes depending on difference in communication lines;
the at least one communication control circuit
acquires the requested communication quality for each type of the transmission data when acquiring a plurality of types of the transmission data,
determines the target communication quality for each type of the transmission data when acquiring the request communication quality with respect to each type of the transmission data,
sets the advantageous communication characteristic to be an advantageous communication line that is more advantageous communication line than a present communication line, sets a communication quality predicted when communicating with the advantageous communication line to the predicted communication quality, and predicts the predicted communication quality for each type of the transmission data, and
performs the selection for each type of the transmission data.

8. The mobile system communication apparatus according to claim 7, wherein
in response to that there are a plurality of untransmitted transmission data for which the advantageous communication line is not selected, the at least one communication control circuit performs again the selection with respect to the plurality of untransmitted transmission data in an order of a period of time from shorter to longer, the period of time being up to a maximum limit time point of the tolerance delay of an individual untransmitted transmission data of the plurality of untransmitted transmission data.

9. The mobile system communication apparatus according to claim 1, wherein
the at least one communication control circuit predicts the predicted position based on a movement plan of the mobile communication apparatus.

10. The mobile system communication apparatus according to claim 1, wherein
an individual communication control circuit of the at least one communication control circuit being configured to include
(i) at least one hardware circuit, or
(ii) at least one central processing unit along with memory storing instructions, or
(iii) a combination of (a) the at least one hardware circuit and (b) the at least one central processing unit along with memory.

11. A mobile system communication apparatus that is either (i) a mobile communication apparatus used in a mobile object, or (ii) a fixed communication apparatus communicating with the mobile communication apparatus, comprising:
at least one communication control circuit configured to:
predict a predicted position of the mobile communication apparatus;
acquire (i) a transmission data, and (ii) a requested communication quality that is a communication quality requested to the transmission data, the requested communication quality including a tolerance delay of the transmission data;
determine a target communication quality that is a target of a communication quality based on the requested communication quality;
predict a predicted communication quality that is a communication quality predicted when communicating with an advantageous communication characteristic that is a communication characteristic more advantageous than a present communication characteristic in respect of a predetermined index, based on (i) the predicted position, and (ii) a correspondence relationship between a position and a communication characteristic used by the mobile communication apparatus; and perform a selection of either (i) transmitting the transmission data with the present communication characteristic, or (ii) transmitting the transmission data with the advantageous communication characteristic, based on a result of comparison between the target communication quality and the predicted communication quality, wherein the at least one communication control circuit predicts the predicted communication quality by setting a communication end position of the advantageous communication characteristic to be a position that the predicted position is enabled to reach earlier than a maximum limit time point of the tolerance delay by at least a period of time during which the transmission data is enabled to be transmitted in the present communication characteristic.

12. The mobile system communication apparatus according to claim 11, wherein the at least one communication control circuit further performs a re-selection that re-executes the selection when a reselection condition is fulfilled.

13. The mobile system communication apparatus according to claim 12, wherein the at least one communication control circuit includes, as the reselection condition, a fact that a reselection period of time has elapsed since the selection was executed.

14. The mobile system communication apparatus according to claim 12, wherein the at least one communication control circuit includes, as the reselection condition, a fact that a parameter determining at least either the target communication quality or the predicted communication quality is updated.

15. The mobile system communication apparatus according to claim 12, wherein the at least one communication control circuit includes, as the reselection condition, a fact that it is determined that a communication with the advantageous communication characteristic was unable to be performed.

16. The mobile system communication apparatus according to claim 11, wherein the at least one communication control circuit predicts the predicted communication quality by reflecting an error of a parameter determining the predicted communication quality.

17. The mobile system communication apparatus according to claim 11, wherein:

the index changes depending on difference in communication lines;

the at least one communication control circuit
  acquires the requested communication quality for each type of the transmission data when acquiring a plurality of types of the transmission data,
  determines the target communication quality for each type of the transmission data when acquiring the request communication quality with respect to each type of the transmission data,
  sets the advantageous communication characteristic to be an advantageous communication line that is more advantageous communication line than a present communication line, sets a communication quality predicted when communicating with the advantageous communication line to the predicted communication quality, and predicts the predicted communication quality for each type of the transmission data, and
  performs the selection for each type of the transmission data.

18. A mobile system communication apparatus that is either (i) a mobile communication apparatus used in a mobile object, or (ii) a fixed communication apparatus communicating with the mobile communication apparatus, comprising:

at least one communication control circuit configured to:

predict a predicted position of the mobile communication apparatus;

acquire (i) a transmission data, and (ii) a requested communication quality that is a communication quality requested to the transmission data, the requested communication quality including a tolerance delay of the transmission data;

determine a target communication quality that is a target of a communication quality based on the requested communication quality;

predict a predicted communication quality that is a communication quality predicted when communicating with an advantageous communication characteristic that is a communication characteristic more advantageous than a present communication characteristic in respect of a predetermined index, based on (i) the predicted position, and (ii) a correspondence relationship between a position and a communication characteristic used by the mobile communication apparatus; and perform a selection of either (i) transmitting the transmission data with the present communication characteristic, or (ii) transmitting the transmission data with the advantageous communication characteristic, based on a result of comparison between the target communication quality and the predicted communication quality, wherein:

the index is a radio field intensity;

the at least one communication control circuit sets the target communication quality to be a data amount of the transmission data to be transmitted before a maximum limit time point of the tolerance delay; and predicts, as the predicted communication quality, a data amount of the transmission data that is enabled to be transmitted by the mobile communication apparatus before the maximum limit time point of the tolerance delay within a communication road segment or a communication period of time during which the radio field intensity changing with movement of the mobile communication apparatus is higher than a threshold value.

* * * * *